(12) United States Patent
Bingel et al.

(10) Patent No.: US 7,065,205 B1
(45) Date of Patent: Jun. 20, 2006

(54) LINE SHARING MULTIPOINT POTS SPLITTER AMPLIFIER-BASED COUPLER

(75) Inventors: Thomas J. Bingel, Belleair Beach, FL (US); Gordon Bremer, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 866 days.

(21) Appl. No.: 09/748,487

(22) Filed: Dec. 27, 2000

Related U.S. Application Data

(60) Provisional application No. 60/182,807, filed on Feb. 16, 2000.

(51) Int. Cl.
*H04M 9/00* (2006.01)

(52) U.S. Cl. .......................... 379/399.01; 379/387.01; 379/93.05

(58) Field of Classification Search ........... 379/399.01, 379/402, 187, 177, 391, 93.01, 93.05, 93.07, 379/476–77, 387.01; 333/1, 5; 375/297, 375/219, 220
See application file for complete search history.

(56) References Cited

U.S. PATENT DOCUMENTS

| | | | | |
|---|---|---|---|---|
| 4,293,739 A | * | 10/1981 | Iijima | 379/417 |
| 4,637,035 A | | 1/1987 | Betts | 375/8 |
| 5,479,504 A | * | 12/1995 | Nakano et al. | 379/402 |
| 5,920,615 A | * | 7/1999 | Nolde | 379/142.13 |
| 6,088,430 A | * | 7/2000 | McHale | 379/93.28 |
| 6,310,953 B1 | * | 10/2001 | Yoshida et al. | 379/399.01 |
| 6,707,822 B1 | * | 3/2004 | Fadavi-Ardekani et al. | 370/395.5 |

* cited by examiner

*Primary Examiner*—Sinh Tran
*Assistant Examiner*—Walter F Briney, III
(74) *Attorney, Agent, or Firm*—Thomas, Kayden, Horstemeyer & Risley LLP

(57) ABSTRACT

The eavesdropping prevention system and method of the present invention provides for shunting leakage signals in a communication system. The amplifier-based coupler is constructed with amplifiers configured with a nearly-zero impedance path which effectively prevents the propagation of a leakage signal onto other communication connections which are coupled to the same communication device. Leakage signals are attenuated due to the nearly-zero impedance path, rather than propagating through the higher impedance communication connections.

20 Claims, 22 Drawing Sheets

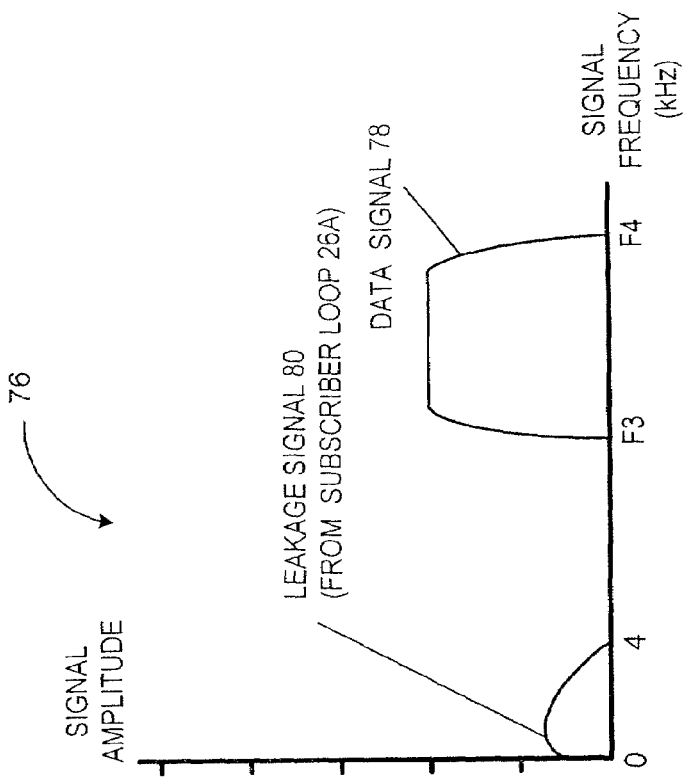
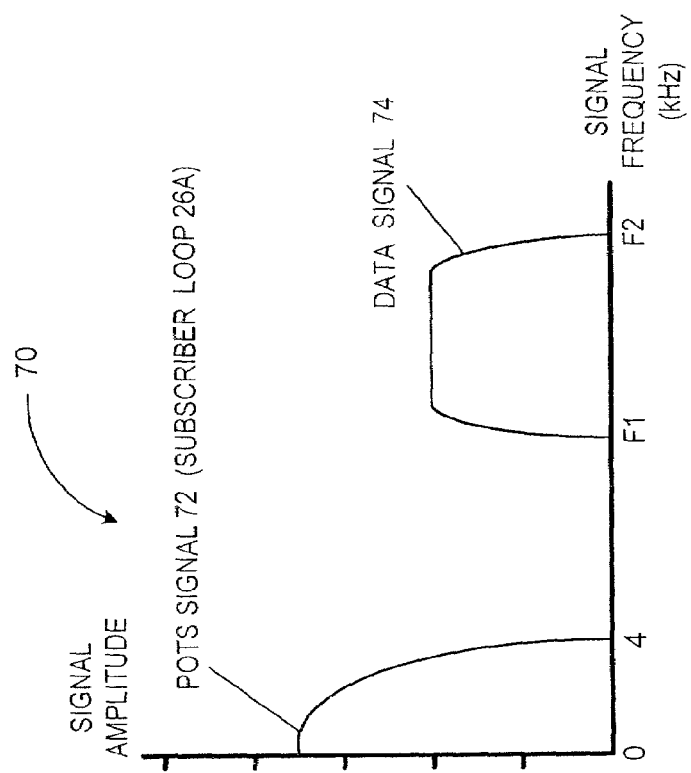

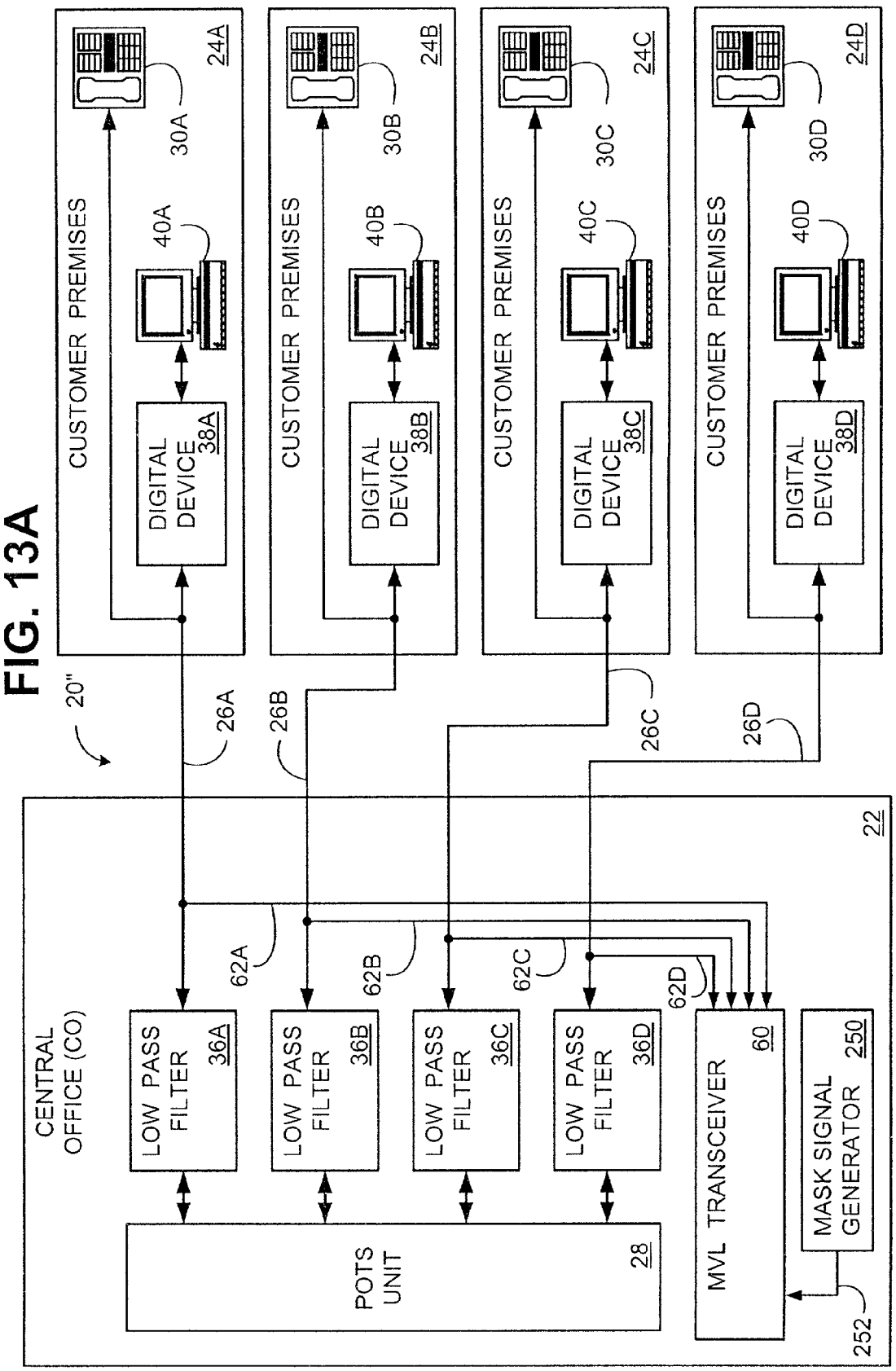

LINE SHARING MULTIPOINT POTS SPLITTER AMPLIFIER-BASED COUPLER

CLAIM OF PRIORITY

This document claims priority to and the benefit of the filing date of co-pending and commonly assigned provisional application entitled "Line Sharing Multipoint POTS Splitter" assigned Ser. No. 60/182,807, filed Feb. 16, 2000, and hereby incorporated herein by reference.

CROSS-REFERENCE TO RELATED APPLICATIONS

This application is related to co-pending and commonly assigned U.S. patent applications entitled "Line Sharing Multipoint POTS Splitter with Intelligent Termination" Ser. No. 09/749,338, filed Dec. 27, 2000, "Line Sharing Multipoint POTS Splitter Masking Noise" now issued as U.S. Pat. No. 6,775,355, issue date Aug. 10, 2004, and "Line Sharing Multipoint POTS Splitter Controllable Line Selector" now issued as U.S. Pat. No. 6,771,740, issue date Aug. 3, 2004, which are incorporated herein by reference.

TECHNICAL FIELD

The present invention relates generally to data communications, and more particularly, to a system and method for enabling a multiple line communication device to communicate over a plurality of different subscriber loops in a manner which prevents a potential third-party eavesdropper from detecting a leakage signal.

BACKGROUND OF THE INVENTION

With the increasing bandwidth demands from the advent of the Internet, service providers have looked for ways to increase data transmission performance over the copper wire local loop transmission lines that connect telephone central offices (COs) to customer premises (CPs). In conventional telephony networks, customer premises equipment (CPE) are coupled to CO switches over the above mentioned transmission lines, which are commonly known as "local loops," "subscriber lines," "subscriber loops," "loops," or the "last mile" of the telephone network. In the art, the term "line" and "loop" are used interchangeably, both terms referring to the copper wire pair used in a typical telephone transmission line conductor. Historically, the public switched telephone network (PSTN) evolved with subscriber loops coupled to a telephone network with circuit-switched capabilities that were designed to carry analog voice communications. "Central office" or "CO" means any site where a subscriber loop couples to a telephony switching unit, such as a public switched telephone network (PSTN), a private branch exchange (PBX) telephony system, or any other location functionally coupling subscriber loops to a telephony network. Digital service provision to the CP is a more recent development. With it, the telephone network has evolved from a system capable of only carrying analog voice communications into a system that can simultaneously carry voice and digital data.

Historically, the POTS subscriber loop was designed with the functions needed to communicate analog voice-conversation signals and subscriber loop signaling. The CO switch uses subscriber loop signaling to notify the customer premises about events in the telephone network, while customer premises equipment (CPE) use subscriber loop signaling to inform the CO to perform actions for the customer. Some examples of subscriber loop signaling include: the CO switch signaling to the CPE that an incoming call has arrived by ringing the phone, the CPE (e.g., a telephone) signaling to the CO switch that the CPE is initiating a call by an on-hook to off-hook transition of the telephone handset, and the CPE signaling to the CO switch that a call should be connected to a location by transmitting the phone number of the location.

Because of the prohibitive costs of replacing or supplementing existing subscriber loops, technologies have been implemented that utilize existing subscriber loops to provide easy and low cost migration to digital technologies. Subscriber loops capable of carrying digital signals are known as digital subscriber lines (DSLs). Various digital technologies provide customers with additional flexibility and enhanced services by utilizing frequency-division multiplexing and/or time-division multiplexing techniques to fully exploit the transmission capability of a subscriber loop. These newer DSL technologies provide digital service to the customer premises without significantly interfering with the existing plain old telephone service (POTS) equipment and wiring by utilizing portions of the available frequency spectrum not used by a POTS signal. These portions of the frequency spectrum are often referred to as "logical channels." Logical channels within a subscriber line that carry digital signals are known as "DSL channels," while logical channels within a subscriber line which carry POTS analog signals are known as "POTS channels."

DSL technologies, such as but not limited to integrated services digital network (ISDN), high-bit-rate digital subscriber line (HDSL), HDSL2 and symmetric digital subscriber line (SDSL), utilize different frequencies of the available frequency spectrum and therefore do not coexist with a POTS signal, which typically utilizes the 0–4 kilohertz (KHz) portion of the available frequency spectrum. These DSL technologies accomplish this functionality by frequency-division multiplexing (FDM) a single data signal onto a logical channel above (at higher frequencies than) the 0 KHz to 4 KHz frequency range used by the analog POTS signals. Such multiplexing techniques and terminology are common to those skilled in the art, and are not described in detail herein.

Several variations of new multiple channel DSL technology exist, such as, but not limited to, Asymmetric Digital Subscriber Line (ADSL), Rate Adaptive Digital Subscriber Line (RADSL), Very High Speed DSL (VDSL), Multiple Virtual Lines (MVL™) and Tripleplay™ with this group generally referred to as xDSL. Communications systems employing xDSL technology may multiplex a plurality of data signals and a single POTS signal onto a single subscriber line. An xDSL system employing frequency-division multiplexing would multiplex a plurality of data signals onto a corresponding plurality of logical channels, each logical channel utilizing a different portion of the available frequency spectrum. An xDSL system employing time-division multiplexing would multiplex a plurality of data signals onto a single logical channel with each different data signal allocated to a predefined portion of time in a predefined, repeating time period.

For example, an xDSL system employing time-division multiplexing of four data signals would subdivide a predefined time period into four sub-periods. Each one of the four data signals would be allocated to one of the four sub-periods. During the first sub-period, the first data signal would be communicated across the subscriber loop. During the second sub-period, the second data signal would be communicated. Likewise, the third and fourth data signals would be communicated during the third and fourth sub-periods, respectively. When the fourth sub-period has ended, the predefined time period repeats, and the first data signal is communicated during a new first sub-period. Thus, four individual data signals can be transmitted sequentially by allocating one of the signals to one of the four sub-periods.

FIG. 1 is a simplified illustrative block diagram of a portion of an existing telephony system 20 which includes a telephone company CO 22 coupled to a CP 24 via a single subscriber loop 26. Subscriber loop 26 may be any suitable connection for communicating electrical signals, but is typically a copper wire pair, as is well known in the art, that was originally designed to carry a 0–4 KHz analog voice channel (POTS signal). Located within the CO 22 is the CO telephony POTS switching unit 28 which communicates POTS signals with the telephone(s) 30 residing in CP 24 via the subscriber loop 26. In some instances, filter(s) 32 may be coupled between subscriber loop 26 and telephone(s) 30.

CO digital equipment 34 and low pass filter 36 may be added at the CO to facilitate transmission of digital data. Digital equipment 34 transmits and receives data signals over subscriber loop 26. When a copper wire pair is used for data signal transmission, the wire pair is often referred to as a digital subscriber loop (DSL).

Low pass filter 36 separates, or splits out, the POTS signal for delivery to POTS switching unit 28. Low pass filter 36 is designed to pass the 0–4 KHz analog POTS signal. In some applications, a POTS splitter (not shown) may be used. Such a POTS splitter may also include a high pass frequency filter designed to pass the data signals, which utilize the portion of the available frequency spectrum above 4 KHz, to the digital equipment 34. Thus, a POTS splitter may split off the data signal from the subscriber loop for delivery to digital device 38, thereby separating the data signal from the POTS analog signal. POTS splitter technology is well known in the art, and is therefore not described in detail herein.

Located within the CP 24 may be a plurality of digital equipment devices 40 which transmit and receive data signals over subscriber loop 26. Illustrative examples of digital equipment devices 40 include, but are not limited to, facsimile (FAX) machines, set top boxes, internet appliances, computers, personal computers (PCs) or the like. A digital device 38, such as a modem or the like, is coupled to or can be interfaced with the digital equipment devices 40 and subscriber loop 26. Digital device 38 may communicate with the plurality of digital equipment devices 40 via an ethernet 42, other local access network (LAN), or the like. Alternatively, digital device 38 may communicate with a single digital equipment device 40 via a cable (not shown). For convenience of illustration, digital device 38 is shown as being a separate device. However, digital device 38 may be incorporated into a digital equipment device as a component.

Digital device 38 decodes a data signal received from the CO digital equipment 34 and transmits the decoded data signal to the digital equipment devices 40. The digital device 38 also encodes data signals received from the digital equipment units 40 into a data signal for transmission to the digital equipment 34. Modulation schemes used to communicate between CO 22 and CP 24 may include, but are not limited to, carrierless amplitude/phase modulation (CAP), quadrature amplitude modulation (QAM), Discrete Multi Tone (DMT) or pulse amplitude modulation (PAM), and are commonly known in the art and are not described in detail herein.

FIG. 2 is a simplified illustrative block diagram of a portion of an existing telephony system 20', which includes a telephone company central office (CO) 22 having POTS switching equipment 28, low pass filter 36 and digital equipment 34, coupled to a customer premises (CP) 24, via a subscriber loop 26, employing multiple channel DSL technology.

With multiple channel DSL, the plurality of digital devices 38 may communicate concurrently with digital equipment 34 employing time-division multiplexing. For convenience, only four digital devices 38 coupled to four PCs 40 are shown. Also, only two telephones 30 and filters 32 are shown. However, any number of either digital devices 38 or telephones 30 could be coupled to subscriber loop 26.

With the system of FIG. 2, any number of the PCs 40 may be concurrently communicating (within their allotted time period and/or allocated band-width) with digital equipment 34 at the CO 22 using time-division multiplexing and/or frequency division multiplexing. Also, one or both of the telephones 30 may be communicating with other telephones (not shown) through POTS switching unit 28 at the same time that the PCs 40 are communicating with digital equipment 34 because the PCs 40 and telephones utilize different logical channels, as described above. Of particular interest is that two people may each be simultaneously using the two telephones 30, such as in a conference call. Because the CP 24 is typically under the ownership and/or control of a single customer, conference calling is acceptable from a convenience and security viewpoint. That is, eavesdropping at the CP 24 is not generally of concern to the CP owner, and if so, the CP owner would be responsible for taking the appropriate safeguards and for implementing any security measures to prevent undesirable eavesdropping at CP 24.

With the advent of multiple channel DSL technology, attempts have been made to couple a plurality of different subscriber loops to a single multiple channel DSL digital equipment unit, thus coupling a plurality of different CPs to a single multiple channel DSL digital equipment unit, such as multiple virtual line (MVL) technology or the like. For convenience, multiple virtual line technology will be referred to as MVL, such use of the phrase MVL is intended to encompass all forms of multiple line technology. FIG. 3 is a simplified illustrative diagram of one such possible system 20". MVL transceiver unit 60 is similar in functionality to the digital equipment 34 (FIGS. 1 and 2) in that MVL transceiver 60 encodes and decodes data signals which are transmitted to or received from digital devices 38A–38D. However, MVL transceiver 60 may have other advantages and features (which are not described in detail herein because such features and advantages are not relevant to the functioning of the present invention described hereinafter).

Four customer premises 24A–24D are coupled to CO 22 via four different subscriber loops 26A–26D, respectively. For convenience, a single telephone 30A–30D resides in each of the CPs 24A–24B, respectively, and is coupled to POTS switching unit 28 to provide connectivity to the outside communication system. PCs 40A–40D are coupled to digital devices 38A–38D, respectively, and communicate over subscriber loops 26A–26D. Telephones 30A–30D also communicate over subscriber loops 26A–26D, respectively, through filters 32A–32D, respectively. Low pass filters 36A–36D, or POTS splitters in some applications, provide for splitting off the POTS signal to the POTS switching unit 28 and for splitting off the data signals to the MVL transceiver 60.

The application of MVL technology, as illustrated in FIG. 3, has one undesirable aspect that has at least one heretofore unaddressed need. This need arises from the fact that the POTS switching unit 28 at the CO 22, via subscriber connections 26A–26D, concurrently provides service to telephones 30A–30D, respectively. These telephones 30A–30D are electrically coupled to each other through a high impedance path via their respective subscriber loops 26A–26D, and the MVL transceiver 60. The high impedance path is such that when two or more persons are talking on two or more telephones 30A–30D, respectively, the audible interference between the telephones is generally negligible. However, as illustrated in FIG. 4A and FIG. 4B, a small amount of a POTS signal, referred to hereinafter as a leakage signal, may be communicated from one of the telephones onto the other subscriber loops.

For example, a person talking on telephone 30A may be sending/receiving a POTS analog signal over subscriber loop 26A (FIG. 3). Because low pass filter 36A may not be entirely efficient in splitting off the POTS analog signal associated with telephone 30A, some of that POTS signal may be detected on connection 62. This leakage signal may also propagate through low pass filters 36B–36D and may be detected on subscriber loops 26B, 26C and/or 26D. Although the amplitude of the POTS analog signal from telephone 30A is not sufficiently great enough to interfere with analog communications from telephones 30B–30D, this leakage signal from telephone 30A may be nonetheless detectable in some situations.

Moreover, in the above-described illustrative example, the user of telephone 30A at CP 24A typically does not want his telephone conversation detectable by a third party who may have access to subscriber loops 26B–26D. That is, the user of telephone 30A typically does not want their conversation being communicated over subscriber loop 26A to be eavesdropped on. For example, the user of telephone 30A may be a stockbroker or security analyst who may be discussing confidential information. An eavesdropper may desire to eavesdrop on the conversation to gain access to the potentially valuable confidential information. Such an eavesdropper, having access to one of the subscriber loops 26B–26D, could detect the leakage signal with appropriate amplification equipment such that the conversation on telephone 30A could be overheard. Thus, there is an heretofore unaddressed need to prevent a third party eavesdropper from overhearing leakage signals that may exist on subscriber loops which have been coupled into a common multiple virtual line (MVL) transceiver 60.

FIGS. 4A and 4B are simplified illustrative examples of the above-described situation wherein a leakage signal (FIG. 4B) associated with a telephone conversation (FIG. 4A) being communicated across subscriber loop 26A (FIG. 3) may be detectable on subscriber loop 26D. FIG. 4A illustrates the available communication system frequency spectrum 70 for subscriber loop 26A. The POTS channel utilizes a portion of the available frequency spectrum from approximately 0–4 KHz. The conversation of the user of telephone 30A would generate an analog POTS signal 72 as shown in FIG. 4A. (For purposes of conveniently illustrating the various signals shown in FIGS. 4A and 4B, the signal amplitude axis has not been numbered. One skilled in the art will realize that any appropriate axis numbering system could have been employed, and that such a numbering system is not necessary to explain the nature of the leakage signal.) Also shown in FIG. 4A is a data signal 74. Data signal 74 would be a data signal transmitted/received by PC 40A (FIG. 3) over subscriber loop 26A, through digital device 38A and MVL transceiver 60. This data signal occupies a logical channel utilizing a portion of the available communication frequency spectrum between a frequency of F1 and a frequency of F2. (One skilled in the art will appreciate that the actual frequency values F1 and F2 need not be described to explain the nature of the leakage signal.)

FIG. 4B illustrates signals on the available communication system frequency spectrum 76 on subscriber loop 26D (FIG. 3). Data signal 78 is the signal transmitted/received by PC 40D over subscriber loop 26D. Data signal 78 occupies a portion of the available frequency spectrum from a frequency of F3 to F4. (One skilled in the art will appreciate that the frequencies F3 and F4 need not be specified for an understanding of the leakage signal, and that frequencies F3 and F4 may or may not correspond to frequencies F1 and F2 of FIG. 4A depending upon the characteristics of the MVL transceiver 60 and the particular multiplexing scheme employed.) Leakage signal 80 is shown to be present on subscriber loop 26D on the POTS analog channel (0–4 KHz). Leakage signal 80 is associated with the analog POTS signal 72 of FIG. 4A. Leakage signal 80 is seen to be a low amplitude signal, being only a fraction of the amplitude of signal 72 (FIG. 4A) and thus, is seen to be of a sufficiently low amplitude such that leakage signal 80 would not significantly interfere with telephone conversations on subscriber loop 26D (FIG. 3). However, the amplitude of leakage signal 80 may be such that an eavesdropper could detect and amplify leakage signal 80, and thus eavesdrop on the phone conversation on telephone 30A.

Leakage signal 80 arises from the manner in which a plurality of communication connections are coupled to a single communication device, such as the MVL transceiver 60. Each of the communication connections are physically coupled to each other by virtue of their connection to various electrical devices. For example, as illustrated in FIG. 3, subscriber loop 26A is physically coupled to subscriber loop 26D through low pass filter 36A, communication connection 62 and low pass filter 36D. Because of the impedance characteristics associated with the electrical devices which separate subscriber loop 26A and 26D, communication signals associated with telephone conversations on subscriber loop 26A are typically attenuated such that leakage signals associated with telephone conversations on subscriber loop 26A will not substantially interfere with communications occurring on subscriber loop 26D. One skilled in the art will appreciate that leakage signal 80 will have some characteristics which are similar to the well known phenomenon of cross-talk. However, cross-talk is quite different from the leakage signal 80. Cross-talk arises from the inductive or capacitive coupling between two communication connections which are substantially adjacent and parallel to each other. Thus, leakage signal 80 is not considered to be a cross-talk phenomenon.

SUMMARY OF THE INVENTION

The eavesdropping prevention system and method in accordance with the present invention provides an improvement to a communication environment, wherein the eavesdropping prevention system and method deters a potential third party eavesdropper from detecting a leakage signal on a multiple channel communication system having a plurality of communication connections coupled to a plurality of communication devices which are in communication with a common multiple channel equipment unit.

A first embodiment of the eavesdropping prevention system and method, a connection sharing multipoint low pass filter with intelligent termination, employs a high-pass filter which effectively blocks the lower frequency leakage signal 80 (FIG. 4B), as described hereinafter and as shown in FIGS. 5–9. The cut-off frequency of the leakage signal (LS) filter 84A–84D (FIG. 6) would be conveniently selected to fall between the upper range of the leakage signal 80 frequency, approximately 4 KHz, and the low-end frequency F3 of data signal 78 (FIG. 4B). This first embodiment of the eavesdropping prevention system and method includes a detect and terminate functions 86A–86D (FIG. 6) which detects service on the communication connection to which each one of the LS filters 84A–84D are coupled to. The detect and terminate functions 86A–86D detects service on the communication connection to ensure that each LS blocking splitter 82A–82D is coupled to an in-service communication connection. If the communication connection becomes out-of-service, such as when a customer discontinues service with the service provider, the detect and terminate functions 86A–86D will automatically de-couple the respective LS filter (84A–84D) from the communication connection so that the LS filter (84A–84D) cannot introduce undesirable harmonics or impedance distortion into the communication system. In an alternative embodiment, the detect and terminate functions 86A–86D would insert an impedance matching element.

The LS blocking splitter eavesdropping prevention system and method can also be conceptualized as providing one or more methods for blocking leakage signals and uncoupling connections in a communication system. In accordance with one method of the invention, the method may be broadly summarized by the following steps: blocking a leakage signal, detecting service on a communication connection, and uncoupling the communication connection from a filter when the communication connection is not in service.

A second embodiment of the eavesdropping prevention system and method, a connection sharing multipoint POTS splitter employing an amplifier-based coupler 146 (FIG. 10), is constructed with a nearly-zero impedance path which effectively prevents the propagation of a leakage signal onto other communication connections which are coupled to the same multiple virtual connection (MVL) transceiver 60, or another communication device, as described hereinafter and as shown in FIGS. 10–12. Leakage signals are highly attenuated by the nearly-zero amplifier output impedance.

The amplifier-based coupler eavesdropping prevention system and method can also be conceptualized as providing one or more methods for shunting leakage signals in a communication system. In accordance with one method of the invention, the method may be broadly summarized by the following steps: coupling an amplifier having a low impedance characteristic between a communication connection and a communication device, and shunting at least one leakage signal originating on the communication connection over the low impedance amplifier thereby preventing the leakage signal from propagating to a second communication connection having a higher impedance characteristic.

A third embodiment of the eavesdropping prevention system and method, a connection sharing multipoint POTS splitter employing a mask signal generator, generates a mask signal 256 (FIG. 14) which is superimposed over leakage signal 80 such that the underlying leakage signal 80 cannot be meaningfully detected and amplified, as described hereinafter and as shown in FIGS. 13–16. The amplitude of mask signal 256 is low enough so as not to interfere with the transmission of analog POTS signals 258 (FIG. 14) over the communication connection on which the mask signal 256 is superimposed. In one embodiment, the amplitude of the mask signal 256 is large enough to exceed the amplitude of any anticipated leakage signal 80 which may be manifested on the communication connection. Alternative embodiments of a mask signal are shown in FIGS. 16A–16C.

The mask signal generator eavesdropping prevention system and method can also be conceptualized as providing one or more methods for generating a mask signal which prevents meaningful detection and amplification of the leakage signal. In accordance with one method of the invention, the method may be broadly summarized by the following steps: generating a mask signal and transmitting the mask signal onto a communication connection.

A fourth embodiment of the eavesdropping prevention system and method, a connection sharing multi-point transceiver employing a controllable line selection unit, isolates a plurality of communication lines such that the underlying leakage signal cannot be meaningfully detected and amplified, as described hereinafter and as shown in FIGS. 17–22. A controller detects transitions between channels of a time-division multiplexed communication signal and actuates a plurality of switches residing in the controllable line selection unit such that the transceiver is coupled to selected communication connections on which the current channel is intended to be communicated over. The controllable line selection unit controller detects transitions to the next channel, and then actuates the switches such that the transceiver is coupled to a different communication connection for which the next channel is to be communicated over. The controllable line selection unit, by selectively coupling the transceiver to selected communication connections, isolates the selected communication connections from the other communication connections thereby preventing the propagation of at least one leakage signal.

The controllable line selection unit system and method can also be conceptualized as providing one or more methods for selectively coupling a transceiver to one of a plurality of communication connections. In accordance with one method of the invention, the method may be broadly summarized by the following steps: detecting transitions between predefined channels of a communication signal, actuating at least one switching device upon the detection of the transition so that a transceiver is coupled to a first communication connection, and actuating the switching device upon the detection of the next transition so that the transceiver is coupled to a second communication connection.

Other systems, methods, features, and advantages of the eavesdropping prevention system and method will be or become apparent to one with skill in the art upon examination of the following drawings and detailed description. It is intended that all such additional systems, methods, features, and advantages be included within this description, be within the scope of the eavesdropping prevention system and method, and be protected by the accompanying claims for the eavesdropping prevention system and method.

BRIEF DESCRIPTION OF THE DRAWINGS

The eavesdropping prevention system and method, as defined in the claims, can be better understood with reference to the following drawings. The components within the drawings are not necessarily to scale relative to each other, emphasis instead being placed on clearly illustrating the principles of the eavesdropping prevention system and method.

FIG. 4A is a simplified graphical representation of the available communication system frequency spectrum having an analog plain old telephony system (POTS) signal and a data signal, both signals being communicated over subscriber loop 26A of FIG. 3.

FIG. 4B is a simplified graphical representation of the available communication system spectrum having a leakage signal corresponding to the analog POTS signal of FIG. 4A and a digital data signal, both signals being communicated over subscriber loop 26D of FIG. 3.

FIG. 13A is a block diagram illustrating a telephone system employing a third embodiment of the present invention, a mask signal generator.

DETAILED DESCRIPTION OF THE INVENTION

Figure 1:
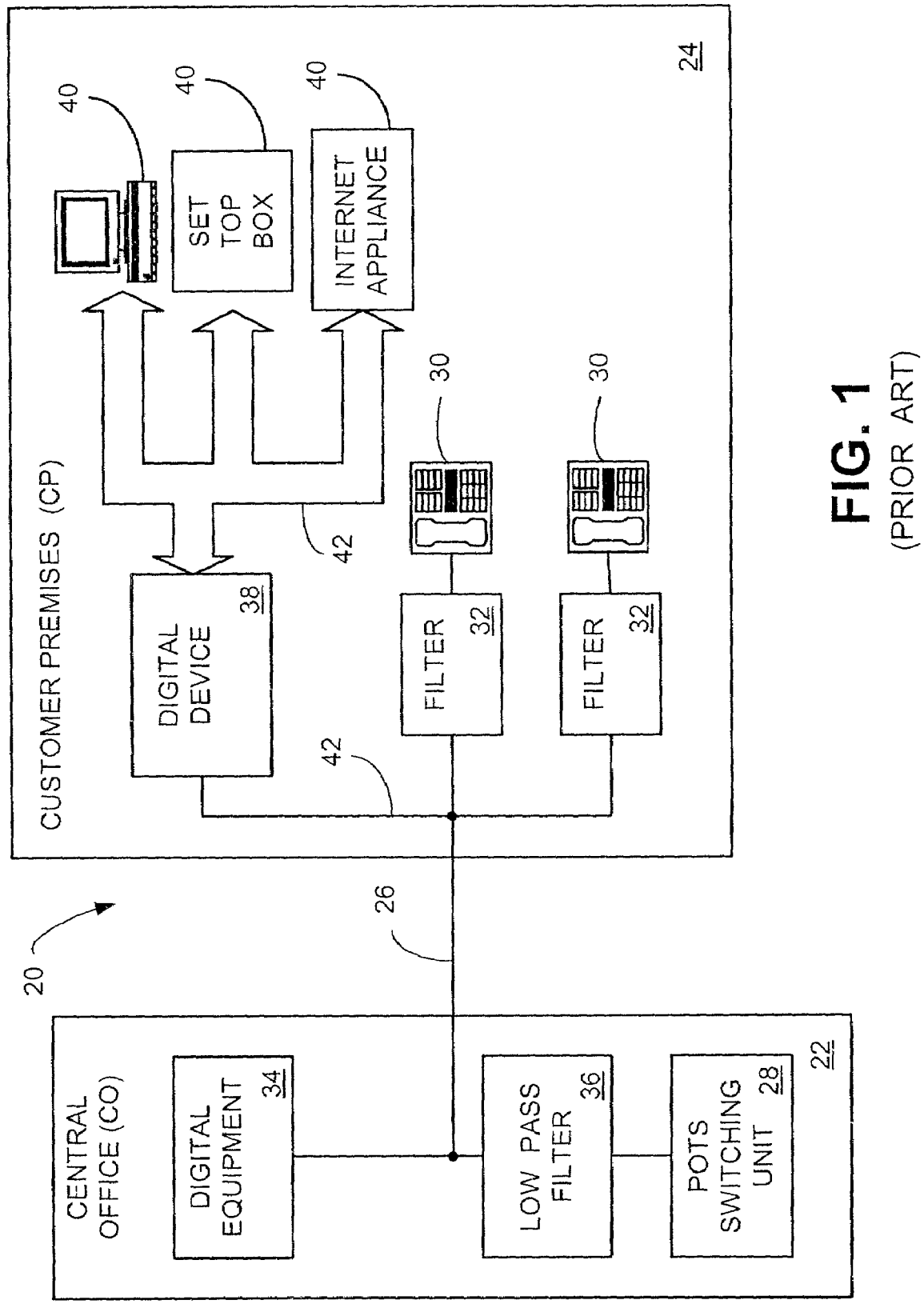
FIG. 1 is a block diagram illustrating a conventional telephony system.
Figure 2:
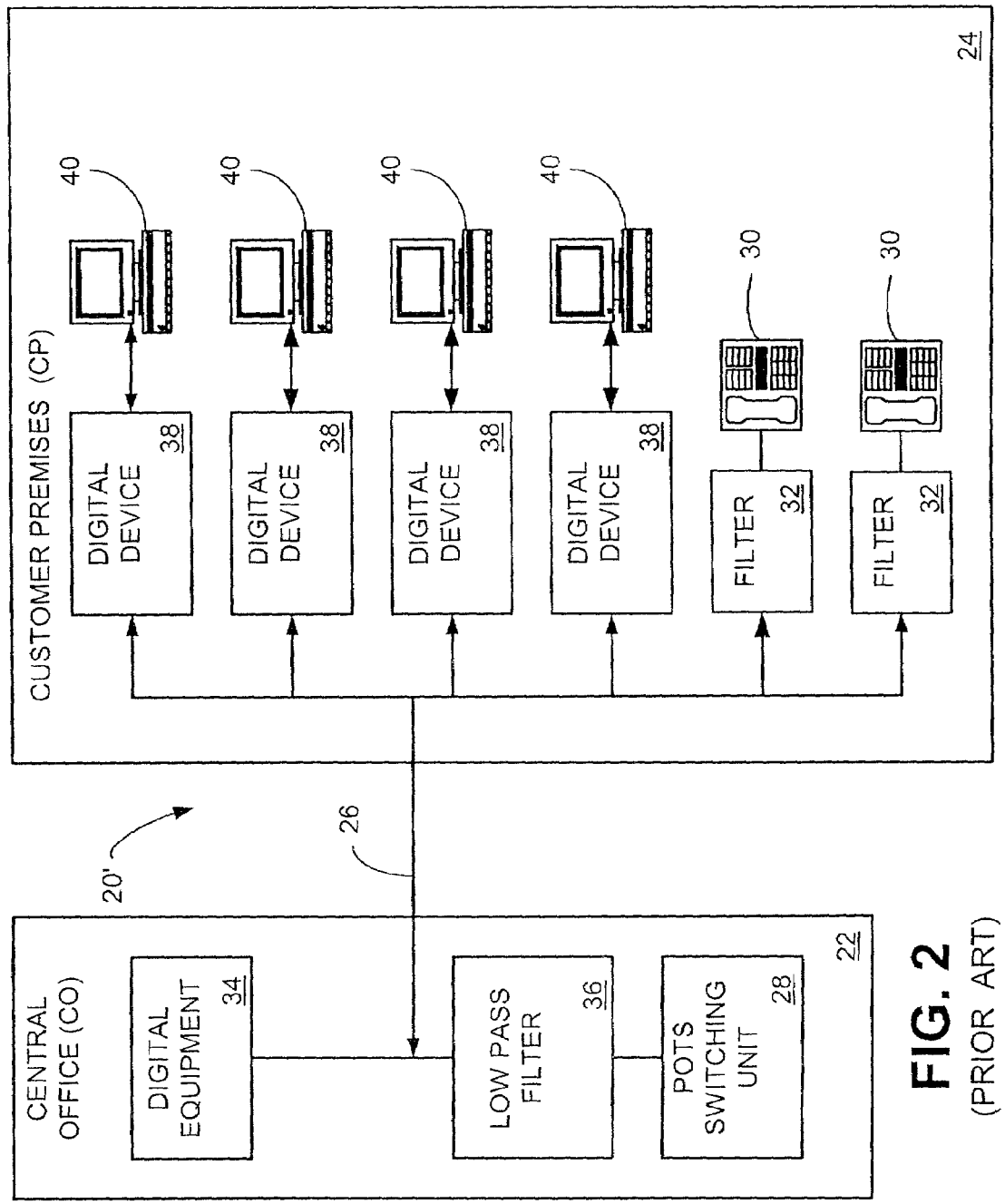
FIG. 2 is a block diagram illustrating a multiple channel digital subscriber loop (DSL) system communicating over a single subscriber loop to the central office of FIG. 1.

A. Overview of the Eavesdropping Prevention System and Method

When a plurality of communication connections are coupled to a common communication device, leakage signals associated with signals on one of the communication connections may propagate onto one or more of the other communication connections. Such a propagated signal is defined herein as a leakage signal. For convenience of describing the nature of the leakage signal and the eavesdropping prevention system and method of the present invention, a leakage signal 80 (FIG. 4B) and the present invention are described above in reference to a single multiple virtual line (MVL) transceiver 60 (FIG. 5) coupled to four subscriber loops 26A–26D. One skilled in the art will appreciate that the present invention, and the associated effects of a leakage signal, may be equally applicable to other types of communication systems. Any such application of an eavesdropping prevention system and method of the present invention, as described hereinafter, employed on such other communication systems are intended to be within the scope of this disclosure and be protected by the accompanying claims for the present invention.

In the absence of the eavesdropping prevention system and method of the present invention, a potential third-party eavesdropper having access to the other communication connections might be able to detect the leakage signal 80, and with appropriate amplification of the leakage signal 80, be able to eavesdrop on a telephone conversation occurring on one of the other communication connections. The eavesdropping prevention system and method will prevent, or at least make more difficult, the detection of leakage signal 80.

Generally described, the present invention pertains to an eavesdropping prevention system and method which prevents, or at least makes more difficult, the detection of leakage signal 80. A first embodiment of the eavesdropping prevention system and method, the connection sharing multipoint POTS splitter with intelligent termination, employs a leakage signal (LS) filter which effectively blocks the lower frequency leakage signal 80, thereby preventing the leakage signal from propagating to other communication connections which are coupled to a common communication device such as, but not limited to, a multiple virtual connection (MVL) digital equipment unit. Also included may be a detect and terminate function which detects service on the communication connection to which the LS filter is coupled to. The detect and terminate function automatically decouples (terminates) the LS filter if the communication connection becomes out-of-service. The second embodiment of the eavesdropping prevention system and method includes an amplifier-based coupler configured with a nearly-zero impedance path, which shunts the leakage signal away from the other communication connections. The third embodiment of the eavesdropping prevention system and method includes a mask signal generator which generates a mask signal that is superimposed over leakage signal 80. The fourth embodiment of the eavesdropping prevention system and method includes a controllable line selection unit which isolates the communication connection over which a signal is being communicated from other communication connections.

Figure 5:
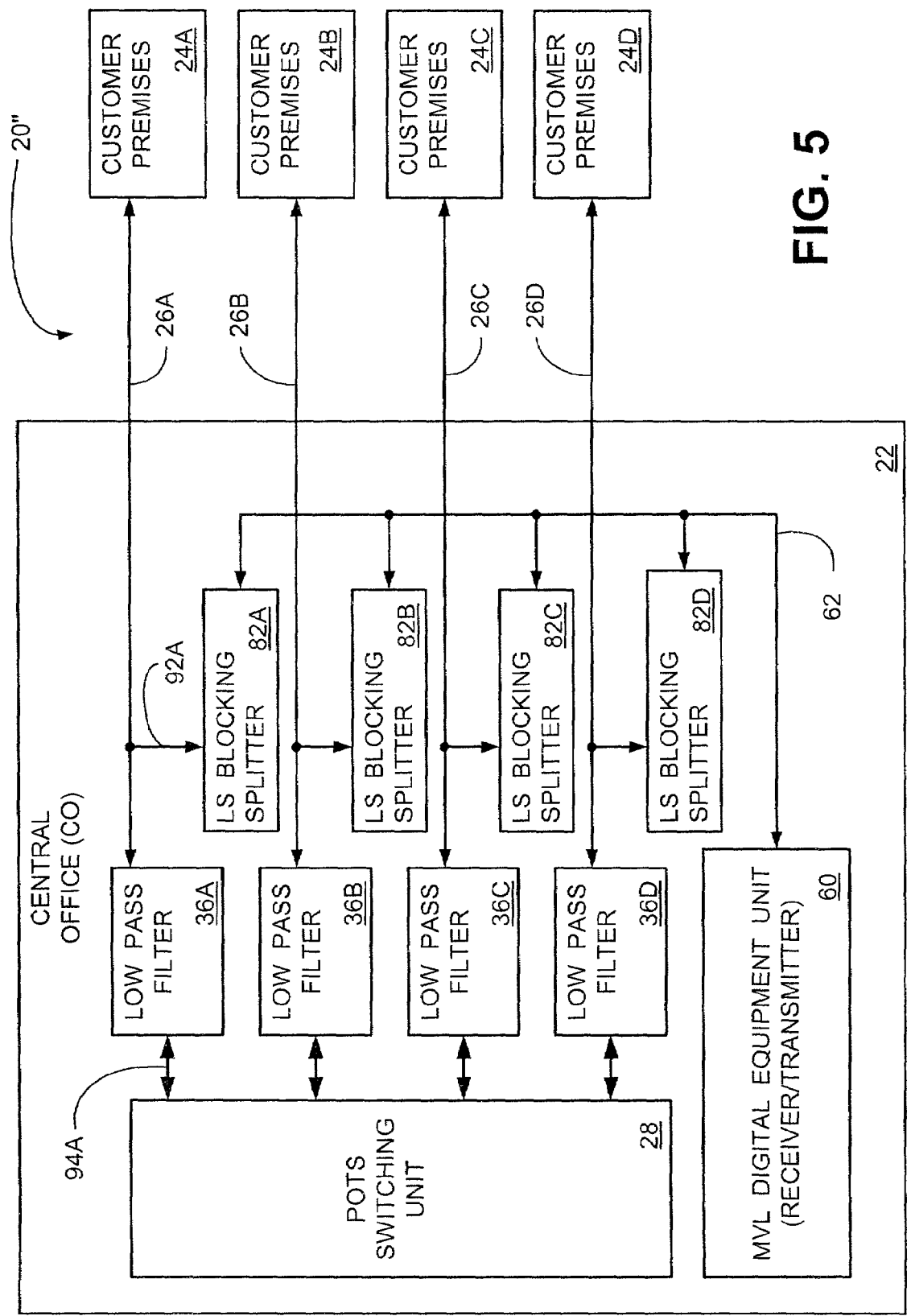
FIG. 5 is a block diagram illustrating a telephone system employing a first embodiment of the present invention, the connection sharing multipoint POTS splitter with intelligent termination which blocks the leakage signal of FIG. 4B.

B. First Embodiment of the Eavesdropping Prevention System and Method: A Connection Sharing Multipoint POTS Splitter with Intelligent Termination 1. LS Blocking Splitter FIG. 5 illustrates a portion of a plain old telephony system (POTS) 20" employing the first embodiment of the eavesdropping prevention system and method, a connection sharing multipoint POTS splitter with intelligent termination, hereinafter referred to as the leakage signal (LS) blocking splitter for convenience. With this preferred embodiment of the LS blocking splitter system and method for eavesdropping prevention, LS blocking splitter 82A may be disposed between a MVL transceiver 60 and subscriber loop 26A such that a leakage signal 80 associated with a telephone conversation occurring in customer premises 24A cannot propagate from subscriber loop 26A onto connection 62. As described hereinabove, if leakage signal 80 (FIG. 4B) propagates onto connection 62 and then onto subscriber loops 26B, 26C and/or 26D, leakage signal 80 might be detectable on subscriber loops 26B, 26C and/or 26D. LS blocking splitter 82A sufficiently attenuates a leakage signal 80, as described hereinafter, to levels below the system noise floor. That is, LS blocking splitter 82A blocks leakage signal 80 from connection 62, and thereby effectively blocks leakage signal 80 from being detected on subscriber loops 26B, 26C and/or 26D.

MVL transceiver 60 is used for convenience of illustration. MVL transceiver 60 receives and transmits digital signals from/to a plurality of digital devices (not shown) residing in customer premises 24A–24D over subscriber loops 26A–26D, respectively. The LS blocking splitter system and method for eavesdropping prevention will work equally well with any similarly functioning communication device or other communication devices wherein a plurality of communication connections are coupled together such that leakage signals may propagate onto the commonly coupled communication connections. It is intended that all such additional systems and communication devices employing the LS blocking splitter be included within the scope of this disclosure and be protected by the accompanying claims for the LS blocking splitter.

Similarly, LS blocking splitter 82B will prevent a leakage signal associated with a telephone conversation occurring in customer premises 24B from propagating from subscriber loop 26B onto connection 62. Likewise, LS blocking splitter 82C and LS blocking splitter 82D prevent leakage signals associated with telephone conversations occurring in customer premises 24C and 24D, respectively, from propagating onto connection 62.

Figure 6:
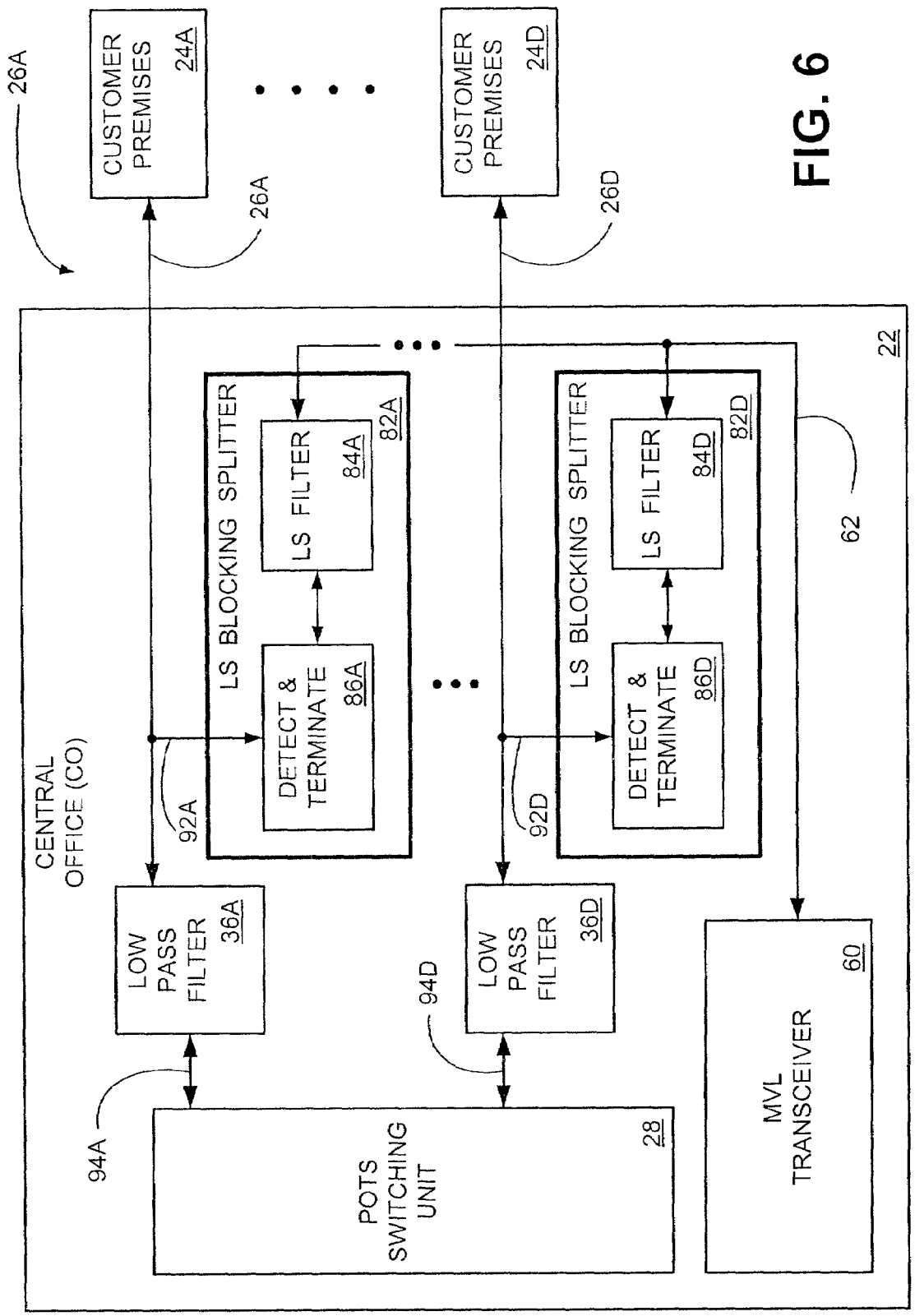
FIG. 6 is a block diagram illustrating a more detailed view of the connection sharing multipoint POTS splitter with intelligent termination of FIG. 5.

FIG. 6 illustrates in more detail the LS blocking splitter. LS blocking splitter 82A is seen to have at least two functional components, an LS filter functional component 84A and a detect and terminate functional component 86A. Similarly, LS blocking splitter 82D is shown to have at least an LS filter functional component 84D and a detect and terminate functional component 86D. LS blocking splitter 82B (not shown) coupled to subscriber loop 26B and customer premises 24B (not shown), and LS blocking splitters 82C (not shown) coupled to subscriber loop 26C and customer premises 24C (not shown) would include the LS filter functional component and the detect and terminate functional component. Connections for LS filter functional component 84A and detect and terminate functional component 86A residing within LS blocking splitter 82A are shown for convenience of illustration only in FIG. 6. A more detailed view of connections for one possible implementation of the LS filter functional component 84A and for one possible implementation of the detect and terminate functional component 86A will be described in detail hereinafter.

2. LS Filter

Figure 7:
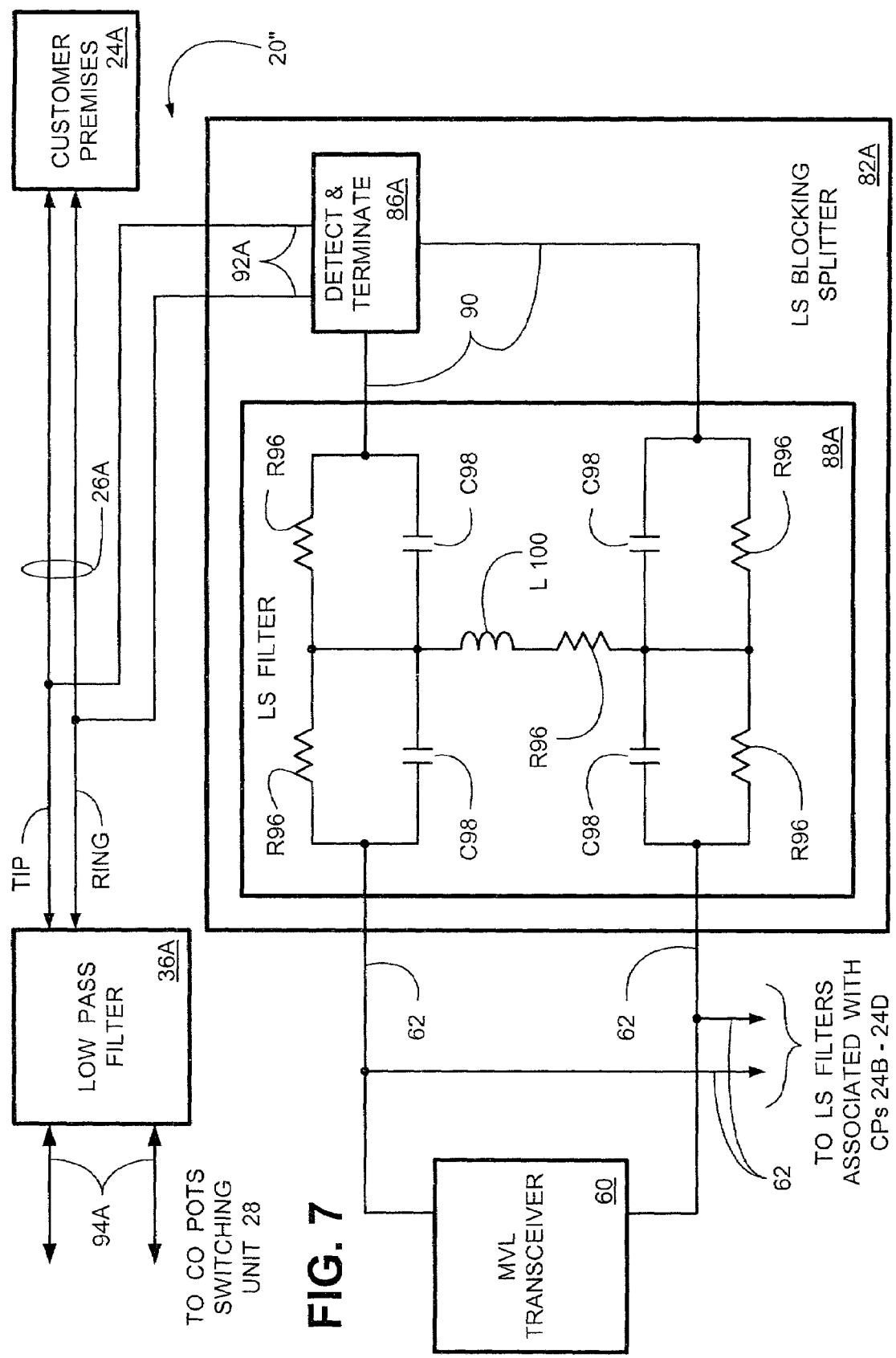
FIG. 7 is a block diagram illustrating a more detailed view of a possible implementation of the LS filter functional component shown in FIG. 6.

FIG. 7 illustrates components that may be used in a possible implementation of the LS filter functional component 82A shown in FIG. 6. LS filter 88A is shown to be coupled to MVL transceiver 60 via connections 62. Here, two connections 62 are shown coupled to LS filter 88A. Also, two connections 62 are shown continuing to LS filters (not shown) associated with customer premises 24B–24D (not shown). These connections 62 correspond to the single connection 62 of FIGS. 5 and 6. One skilled in the art will appreciate that in a telephony system 20", connections shown in FIGS. 5 and 6 represent wire pairs, also known as a loop. Such connections may be properly shown as a single connection in FIGS. 5 and 6 for convenience of illustration.

LS filter 88A is shown coupled to the detect and terminate functional component 86A by connections 90. The detect and terminate functional component 86A is coupled to POTS splitter 36A via connections 92A. These connections 92A correspond to the single connection 92A shown in FIGS. 5 and 6, which are shown as a single connection for convenience of illustration. Subscriber loop 26A is shown to have two conductors, the tip conductor and the ring conductor, as is well known in the art. Subscriber loop 26A is shown coupling into low pass filter 36A. Connections 94A couple the low pass filter 36A to the CO POTS switching unit 28. For illustrative convenience, connections 94A and subscriber loop 26A are shown as single connections in FIGS. 5 and 6 and as wire pairs in FIG. 7. Connections 94A and subscriber loop 26A are configured within the low pass filter 36A to provide the necessary connectivity, as is well known in the art.

LS filter 88A is a high-pass filter employing resistive, capacitive and inductor elements. Resistor elements R96, capacitor elements C98 and inductor element L100 are selected such that LS filter 88A will prevent leakage signal 80 (FIG. 4B) from propagating from subscriber loop 26A, through the connections and components associated with LS blocking splitter 82A, onto connections 62. The cut-off frequency associated with the preferred embodiment of LS filter 88A would be selected to have a frequency between 4 kHz and frequencies F1 and/or F3 (FIGS. 4A and 4B). The LS filter 88A cut-off frequency is so selected to allow data signal 74 and/or data signal 78 (FIGS. 4A and 4B) to propagate through telephony system 20" and to block leakage signal 80. Actual values of R96, R98 and L100 may be determined and implemented using well known techniques commonly employed in the art of filter design and construction. Any suitable cut-off frequency which blocks leakage signal 80 without interfering with the propagation of data signal 74 may be selected for LS filter 88A without departing substantially from the spirit and principles of the LS blocking splitter 82A. Furthermore, LS filters 88B–88D, may be constructed substantially identical to filter 88A, or alternatively, LS filters 88B–88D may be constructed with differing cut-off frequencies or differing components and/or configurations such that the operation and functionality of the LS filters 88A–88D effectively block leakage signals. It is intended that all such variations in the construction of LS filter 88A, including variations in configuration and/or variations in the number and/or size of the resistive, capacitive and inductive elements, be within the scope of this disclosure and be protected by the accompanying claims.

3. Detect and Terminate Function/Component Overview

The preferred embodiment of the LS blocking splitter includes an optional detect and terminate functional component 86A, in FIG. 7, is shown to be coupled to LS filter 88A via connections 90 and to subscriber loop 26A via connections 92A. These connections for the detect and terminate functional component 86A with connections 90 and 92A are shown for convenience of illustration only. Actual connections for one implementation of the detect and terminate functional component 86A will be described in detail hereinafter and shown in FIG. 9.

Figure 8:
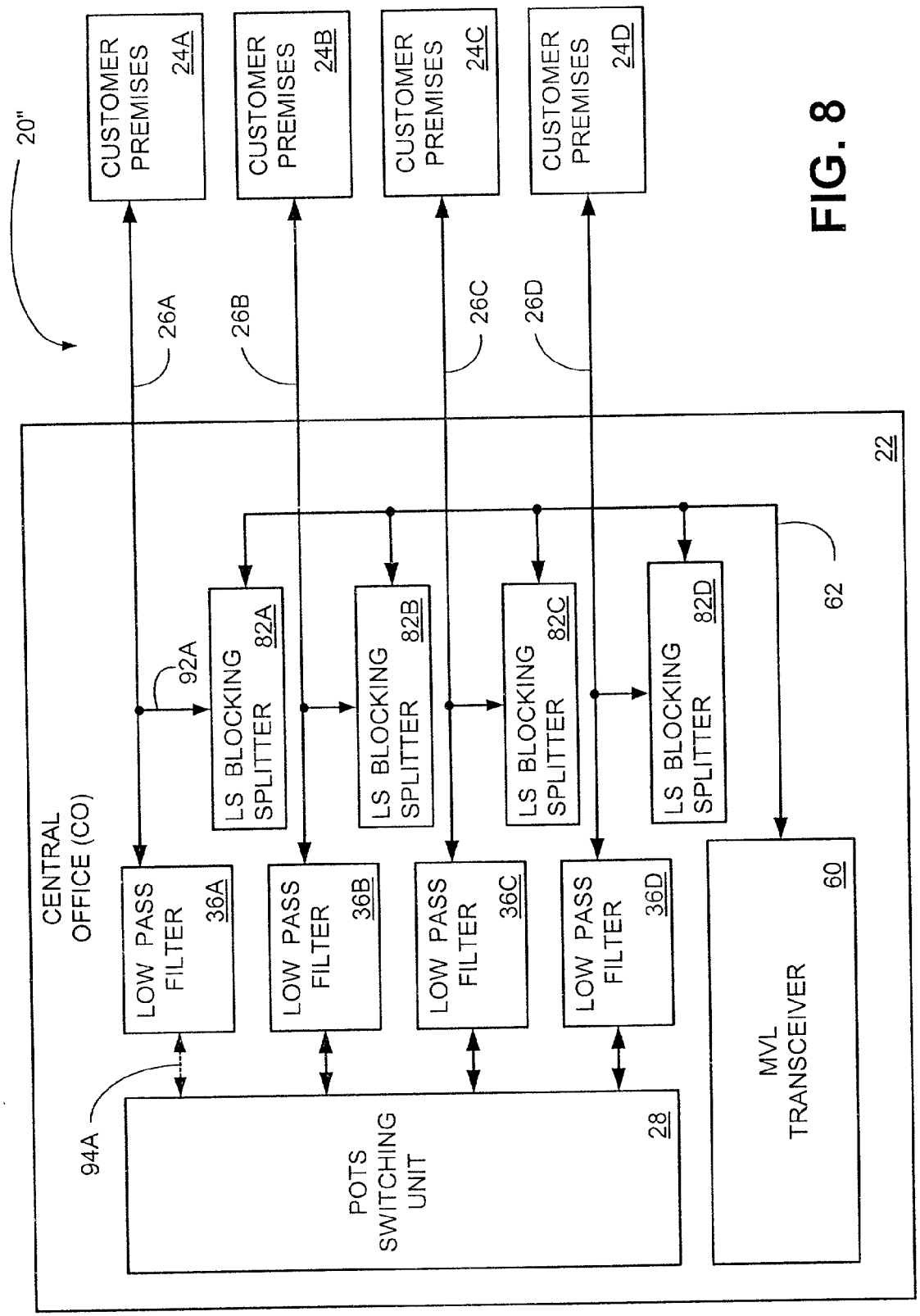
FIG. 8 is a block diagram illustrating the telephone systems of FIGS. 5 and 6 with the POTS switching unit de-coupled from the POTS splitter associated with subscriber loop 26A de-coupled.

FIG. 8 illustrates a telephony system 20" corresponding to the portion of the telephony system 20" shown in FIG. 5. However, connection 94A has been de-coupled between POTS switching unit 28 and the low pass filter 36A, as indicated by the single dashed connection for illustrative convenience. Subscriber loop 26A may become de-coupled in any variety of manners (hereinafter referred to as an out-of-service condition). Such an out-of-service condition might occur when the customer associated with customer premises 24A has discontinued service with the service provider. For example, the customer may have vacated the customer premises 24A or may have been de-coupled for failure to make payment to the service provider. Alternatively, the service provider could effect an out-of-service condition by de-coupling at other convenient locations, such as, but not limited to, within POTS switching unit 28 and/or the low pass filter 36A.

In any of the above-described scenarios, or in similar situations, proper functioning of the MVL transceiver 60 or other communication device may require the detection of the out-of-service condition and appropriate actuation of switches to de-couple LS blocking splitter 82A from subscriber loop 26A. The detection of the out-of-service condition and the associated de-coupling of LS blocking splitter 82A is performed by the detect and terminate functional component 86A (FIG. 7). LS blocking splitters 82B–82D would also employ a detect and terminate functional component (not shown), similar to the detect and terminate functional component 86A, to identify out-of-service conditions on their respective subscriber loops 26B–26D. During an out-of-service condition, the impedance characteristics associated with the LS filter functional component and the impedance characteristics of the low pass filter 36A, subscriber loop 26A and any connected equipment at customer premises 24A may be such that the communication of data signals by MVL transceiver 60, equipment in customer premises 24B–24D, and/or other equipment (not shown) in CO 22 might be adversely affected by interference signals generated by subscriber loop 26A, by low pass filter 36A, and/or by equipment residing in customer premises 24A. Therefore, the detect and terminate functional component (not shown) of LS blocking splitters 82A–82D may be required to de-couple and reconfigure LS filters 88A–88D, respectively, in a manner described hereinafter.

Figure 9:
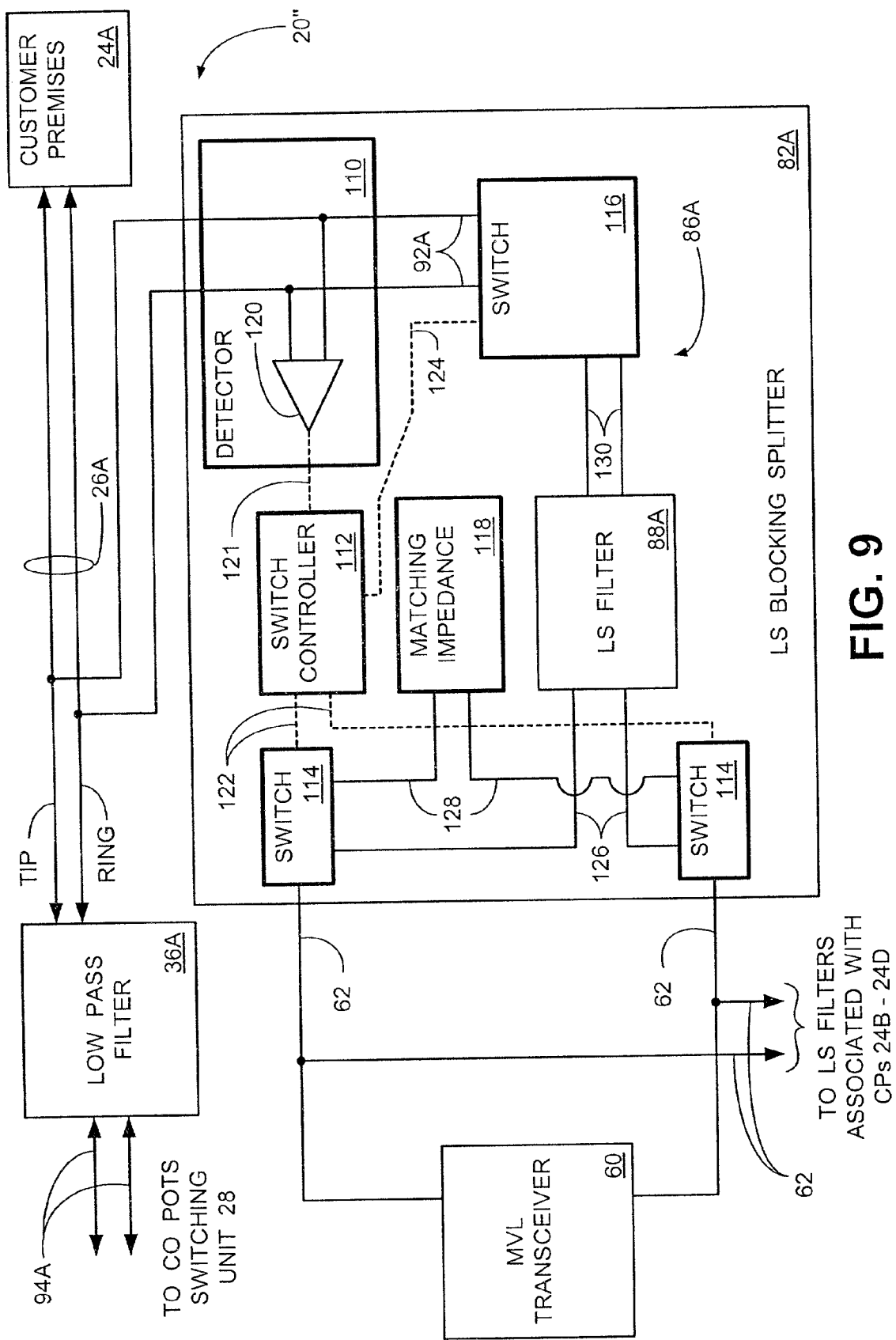
FIG. 9 is a block diagram illustrating a more detailed view of a possible implementation of the detect and terminate function of FIGS. 6 and 7.

FIG. 9 illustrates one possible implementation of components used in the preferred embodiment of the detect and terminate functional component 86A (see also FIGS. 6 and 7) residing in LS blocking splitter 82A. Components associated with the detect and terminate functional component 86A include detector 110, switch controller 112, switches 114, switch 116 and matching impedance element 118. Switches 114 are coupled to LS filter 88A via connections 126, and are coupled to matching impedance 188 via connections 128. Switch 116 is coupled to LS filter 88A via connections 130.

4. Detector Employed in the Detect and Terminate Functional Component

In the embodiment of the LS blocking splitter 82A shown in FIG. 9, detector 110 is shown to be detecting voltage across the connections 92A which couple LS blocking splitter 82A to subscriber loop 26A (see also FIGS. 5–8). In the preferred embodiment illustrated in FIG. 9, detector 110 includes a high-input impedance instrumentation amplifier (IA) 120. In alternative embodiments of detector 110, voltage on one of the connections 92A may be detected. Another alternative embodiment of detector 110 may sense current on one or both connections 92A. Yet another alternative embodiment of detector 110 may detect voltage and/or current on subscriber loop 26A. Such detector methods and apparatus are well known and commonly employed in the arts of measuring electrical current and voltage, and are not described in detail herein. Any such variations and/or modifications in the detector method employed in an LS blocking splitter may be employed without departing substantially from the spirit and principles of the present invention. Furthermore, detector methods and apparatus employed in the LS blocking splitter may reside in convenient alternative locations, such as, but not limited to, other electrical equipment or in stand alone facilities, without adversely affecting the functionality of the LS blocking splitter. Any such alternative embodiments of the detector methods and apparatus so employed are intended to be within the scope of this disclosure and be protected by the accompanying claims for the LS blocking splitter system and method.

5. Switch Controller Employed in the Detect and Terminate Functional Component

In the embodiment of LS blocking splitter 82A illustrated in FIG. 9, detector 110 provides information corresponding to the detected voltage on connections 92A to switch controller 112 via control connection 121. Switch controller 112 actuates switches 114 via control connections 122, and switch 116 via control connection 124. The purpose of switches 114 and switch 116 is to de-couple LS filter 88A and to couple matching impedance element 118.

In the normal operating state, where MVL transceiver 60 is in communication with equipment residing at customer premises 24A (an in-service condition), LS filter 88A is coupled between MVL transceiver 60 and subscriber loop 26A by the appropriate configuration of switches 114 and switch 116. Signals transmitted from MVL transceiver 60 to customer premises 24A propagates over connections 62 through switches 114, over connections 126 through LS filter 88A, over connections 130 through switch 116, and then onto customer premises 24A via subscriber loop 26A. Data signals transmitted by equipment residing in customer premises 24A are transmitted to MVL transceiver 60 over the same path (in reverse order).

When service to customer premises 24A is in the out-of-service condition, such as when connections 94A are opened to de-couple low pass filter 36A and POTS switching unit 28 (FIG. 8), detector 110 detects this out-of-service condition. For example, detector 110 as shown in FIG. 9 may be detecting DC voltage on one or both of the connections 92A. The out-of-service condition here would be detected when DC voltage changes to substantially zero (0) volts. Detector 110 provides an indication of the out-of-service condition to switch controller 112 such that switches 114 and 116 are actuated to reconfigure the LS blocking splitter 82A by de-coupling LS filter 88A and by coupling matching impedance element 118. Thus, switches 114 couple matching impedance element 118 to connections 62 via connections 128.

6. Matching Impedance Employed in the Detect and Terminate Functional Component

Matching impedance element 118 corresponds to the impedance seen from MVL transceiver 60 out to subscriber loop 26A. Matching impedance element 118 has resistive, capacitive and/or inductive components sized and configured to approximate the impedance characteristics of the system seen by MVL transceiver 60 when looking out to subscriber loop 26A. This matching impedance would approximately match the impedance characteristics of LS blocking splitter 82A so as to maintain a balanced impedance system. Such a balanced impedance system may be desirable to ensure acceptable performance of MVL transceiver 60 or other communication devices. One skilled in the art will appreciate that determining transmission system impedance characteristics seen by MVL transceiver 60 is well known in the art, and therefore, is not described in detail herein. Furthermore, one skilled in the art will appreciate that the determination, selection and configuration of impedance components (resistive, capacitive and/or inductive) employed within the matching impedance element 118, may be determined and implemented using well known techniques commonly employed in the art of impedance matching. Therefore, the easily determined elements employed in matching impedance element 118 and their numerous configurations are not described in detail herein. The numerous apparatus and methods of constructing matching impedance element 118 may be employed in the above-described embodiment of the LS blocking splitter 82A without departing substantially from the spirit and principles of the LS blocking splitter. It is intended that all such systems, methods and configurations of matching impedance element 118 be included herein within the scope of this disclosure and be protected by the accompanying claims for the LS blocking splitter.

7. Alternative Embodiments of an LS Blocking Splitter

An alternative embodiment of the LS blocking splitter could be incorporated as a functioning component of a stand alone POTS splitter. That is, referring to FIG. 5, low pass filter 36A and LS blocking splitter 82A could be integrated into a single POTS splitter.

Another alternative embodiment of the LS blocking splitter 82A (as described by referencing elements shown in FIG. 9 for convenience) may not require matching impedance element 118. In such an alternative embodiment, switches 114 should be actuated to de-couple LS filter 88A from connection 62. Another alternative embodiment of the detect and terminate function 86A may not employ switches 114, but may merely actuate switch 116 to isolate MVL transceiver 60 and LS blocking splitter 82A from subscriber loop 26A.

Another alternative embodiment may not use switches 114 to de-couple LS filter 88A, but rather switch in matching impedance element 118 in parallel with LS filter 88A such that the desired impedance characteristic seen by MVL transceiver 60 is achieved. Another alternative embodiment of the detect and terminate function 86A could be configured to switch matching impedance element 118 in series or in parallel with LS filter 82A, thereby achieving the desired impedance characteristics. Any such implementations of the LS blocking splitters 82A–82D, and LS blocking splitters employed in alternative embodiments of the present invention, are intended to be within the scope of this disclosure and be protected by the accompanying claims.

Switch controller 112 may be implemented as hardware or a combination of hardware and firmware. When implemented as hardware, switch controller 112 can be constructed of any of the commonly employed technologies in the well known art of controlling switches. An alternative embodiment of the switch controller 112 may be implemented as firmware, software or other computer-readable medium stored in a memory (not shown) that is executed by a suitable microprocessor (not shown) residing in switch controller 112 or residing in another convenient location and in communication with switch controller 112. Software instructions associated with a program which implements the detect and terminate function, which each comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. Any such implementations of the switch controller 112 are intended to be within the scope of this disclosure and be protected by the accompanying claims for the LS blocking splitter.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, if necessary, and then stored in a computer memory.

The switching functions performed by switches 114 and switch 116, as controlled by switch controller 112, may be implemented with any type of electronic, solid state or firmware type switching device or means commonly employed in the art. Such controlled switches 114 and switch 116, in the above-described embodiment or in alternative embodiments, could be implemented by a combination of software and firmware using components and methods commonly employed in the art of switching electrical devices. It is intended that all such implementation of switches 114 and switch 116, and their associated control means, be included herein within the scope of this disclosure and be protected by the accompanying claims for the LS blocking splitter.

Figure 10:
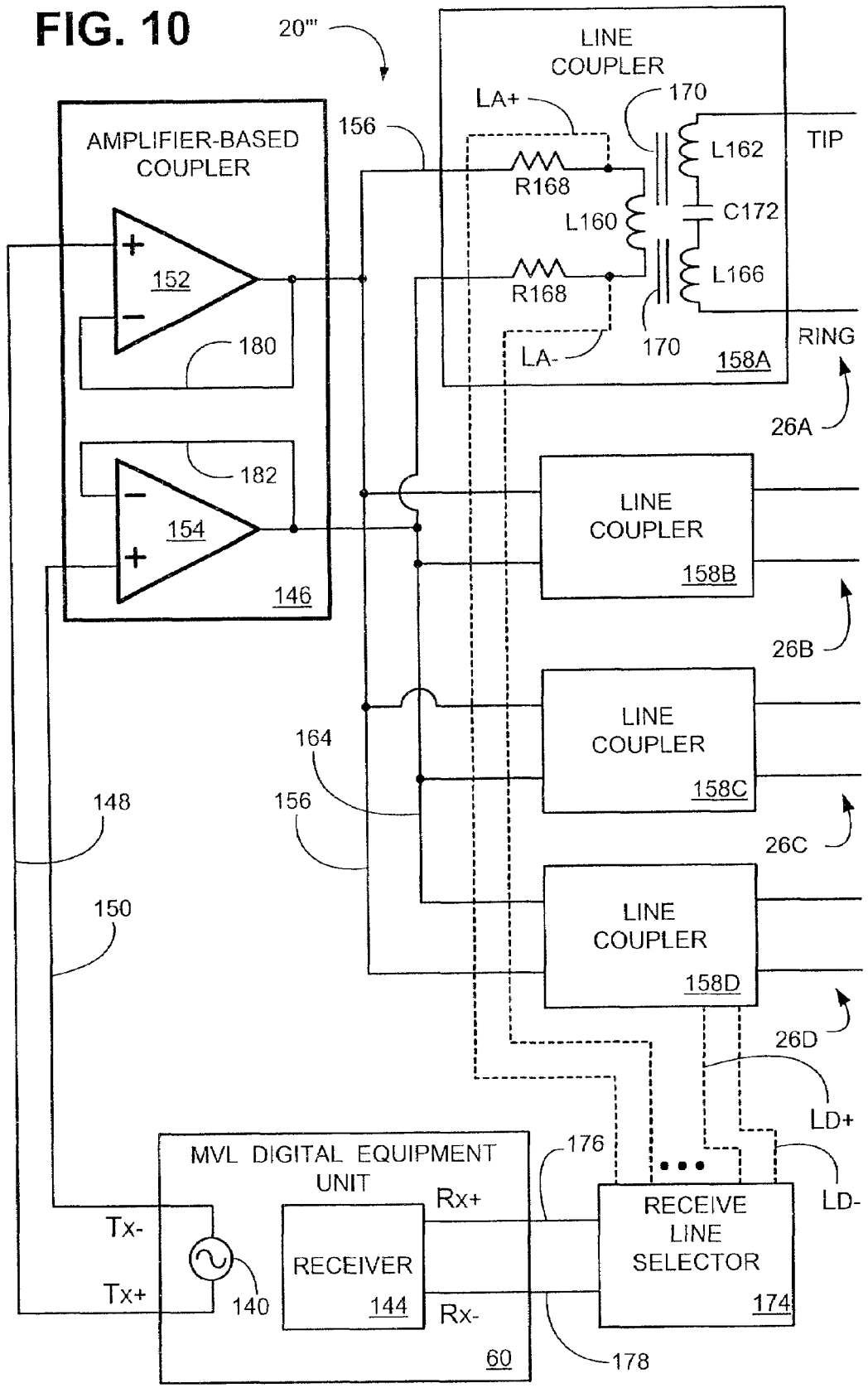
FIG. 10 is a block diagram illustrating a telephone system employing second embodiment of the present invention, an amplifier-based coupler.

C. Second Embodiment of the Eavesdropping Prevention System and Method: A Connection Sharing Multipoint POTS Splitter with an Amplifier-Based Coupler 1. Amplifier-Based Coupler Overview FIG. 10 illustrates a portion of a telephony system 20''', which corresponds to telephony system 20" (FIG. 3), employing the second embodiment of the eavesdropping prevention system and method, a connection sharing multipoint POTS splitter with an amplifier-based coupler, hereinafter referred to as the amplifier-based coupler for convenience. Amplifier-based coupler 146 couples MVL transceiver 60 with a plurality of subscriber loops 26A–26C. For convenience of illustration, the amplifier-based coupler 146 couples four subscriber loops 26A–26D to MVL transceiver 60. However, the amplifier-based coupler 146 could be configured to couple two subscriber loops, three subscriber loops, or more than four subscriber loops, to the MVL transceiver 60. MVL transceiver 60 is used for convenience of illustration. The amplifier-based coupler 146 will work equally well with any similarly functioning communication device or other communication devices wherein a plurality of communication connections are coupled together such that leakage signals may propagate unto onto the commonly coupled communication connections. It is intended that all such additional systems and communication devices employing the amplifier-based coupler 146 be included within the scope of this disclosure and be protected by the accompanying claims for the amplifier-based coupler 146.

2. MVL Transceiver

For convenience of illustration and to facilitate the disclosure of the functionality and operation of the amplifier-based coupler 146, the amplifier-based coupler 146 is shown to be coupled with MVL transceiver 60. MVL transceiver 60 has at least the well known components of a transmitter 140 and a receiver 144. Transmitter 140, as employed according to FIG. 10, is a balanced differential voltage signal source. Operation of the transmitter 140 and receiver 144 are not described in detail herein other than to the extent necessary to understand the operation and functioning of these components as part of an MVL transceiver 60, employing the amplifier-based coupler system and method of the present invention. Accordingly, the amplifiers 152 and 154 amplify a voltage signal received from transmitter 140.

One skilled in the art will realize that MVL transceiver 60 and other similarly functioning communication devices, may have the transmitter 140 and/or receiver 144 connected in a different order and/or manner than shown in FIG. 10, or may not include both the transmitter 140 and receiver 144 as shown in FIG. 10, or may include additional components connected in some other manner with the transmitter 140 and/or receiver 144. For example, transmitter 140 could be a signal current source, and amplifiers 152 and 154 would then be configured to amplify a current signal received from transmitter 140. Also, the amplifier-based coupler could be employed to couple other types of communication devices to a plurality of communication connections. Any of the above-described variations may be made without departing substantially from the spirit and principles of the amplifier-based coupler 146 system and method, and as such, are not pertinent to an explanation of the operation of the amplified-based coupler and are not explained in detail herein. Any such variations in a MVL transceiver 60, or other communication device, employing the amplifier-based coupler 146 system and method are intended to be within the scope of this disclosure and be protected by the accompanying claims for the amplifier-based coupler 146.

MVL transceiver 60 is coupled to the preferred embodiment of amplifier-based coupler 146 via two connections 148 and 150. Connections 148 and 150 provide the path for the positive transmit signal (Tx+) and the negative transmit signal (Tx–), respectively, generated by the transmitter 140. Tx+ is received by a first amplifier 152 via connection 148. The Tx– signal is received by a second amplifier 154 via connection 150. Amplifier 152 amplifies the Tx+ signal to an appropriate power level and transmits the amplified Tx+ signal onto connection 156. Amplifier 154 amplifies the Tx– signal to an appropriate power level and transmits the amplified Tx– signal onto connection 164.

3. Line Couplers

For illustrative convenience and to disclose the functionality and operation of amplifier-based coupler 146, amplifier-based coupler 146 is shown to be coupled to line couplers 158A–158D. Connection 156 couples to line couplers 158A–158D. Line coupler 158A, also known as a transformer, provides magnetic coupling to subscriber loop 26A such that the amplified Tx+ signal on connection 156 is induced onto the tip conductor of subscriber loop 26A through inductor L160 and inductor L162. Similarly, the Tx– signal is amplified by amplifier 154 and output onto connection 164. The amplified Tx– signal on connection 164 is induced onto the ring conductor of subscriber loop 26A through inductor L160 and inductor L166. As is well known in the art, line coupler 158A typically includes a resistance R168, an iron core 170 to facilitate magnetic coupling between inductor L160 and inductor L162 and for coupling between inductor L160 and inductor L166, and a direct current (DC) blocking capacitor C172. Detailed operation of these individual components of line couplers 158A–158D are well known in the art, and as such, are not described in detail herein other than to the extent necessary to understand the operation and functioning of these components as related to the functioning and operation of the amplifier-based coupler 146. One skilled in the art will realize that line couplers 158A–158D, other transformer-based driver systems, or other similarly performing circuits, may have the components shown in FIG. 10 connected in a different order and manner than shown in FIG. 10, or may not include all of the components shown in FIG. 10, or may include additional components connected in some manner with the components of the line couplers 158A–158D shown in FIG. 10. For example, a Norton based equivalent circuit employing current output amplifiers may be used to provide the necessary coupling between the MVL transceiver 60 and subscriber loops 26A–26D. Any such variations in a line coupler or similarly performing circuit which employs the amplifier-based coupler 146 system and method may be made without departing substantially from the spirit and principles of the amplifier-based coupler 146, and as such, are intended to be within the scope of this disclosure and be protected by the accompanying claims for the amplifier-based coupler 146.

Figure 3:
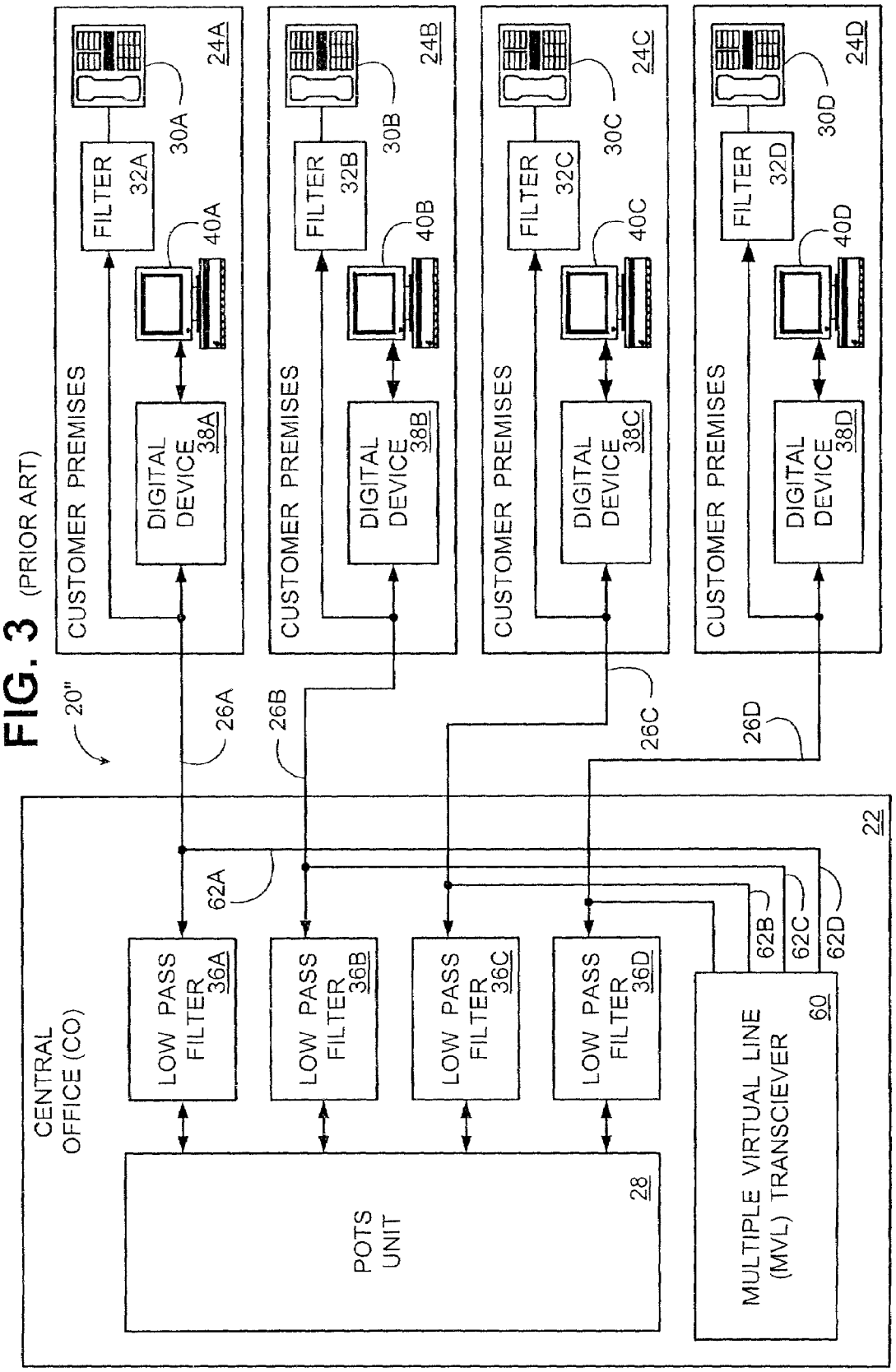
FIG. 3 is a block diagram illustrating four customer premises coupled to a central office via four separate subscriber loops, with each of the customer premises having a digital device communicating with a multiple virtual connection (MVL) digital equipment unit located in the central office.

Line coupler 158B is shown to couple connections 156 and 164 to subscriber loop 26B. For convenience of illustration, a detailed diagram of line coupler 158B showing internal components similar to the components of line coupler 158A is not shown. Line coupler 158B, when coupled to subscriber loop 26B and connections 156 and 164, would be coupled in a similar manner and have like components as the line coupler 158A. Likewise, line coupler 158C couples connections 156 and 164 to subscriber loop 26C and line coupler 158D couples connections 156 and 164 to subscriber loop 26D. Thus, the amplified Tx+ signal on connection 156 is transmitted to the tip conductor of each of the subscriber loops 26A–26D, and the amplified Tx– signal on connection 164 is transmitted to the ring conductor of each of the subscriber loops 26A–26D. Subscriber loops 26A–26D provide the transmission path to customer premises 24A–24D (FIG. 3). Thus, digital devices 38A–38D (FIG. 3) are able to receive data signals (Tx+, Tx–) transmitted by the MVL transceiver 60 transmitter 140.

Alternative embodiments of a line coupler may incorporate inductors L162 and L166 into a POTS splitter (not shown). Or, a line coupler may be included as part of a POTS splitter (not shown) or similarly functioning device. One skilled in the art will appreciate that these alternative embodiments of the line coupler may be made without departing substantially from the spirit and principles of the amplifier-based coupler 146, and as such, are intended to be within the scope of this disclosure and be protected by the accompanying claims for the amplifier-based coupler 146.

Data signals transmitted from the customer premises 24A–24D arrive at line couplers 158A–158D, respectively. When a signal is transmitted by digital device 38A from customer premises 24A (FIG. 3), a positive received signal (Rx+) is delivered over the tip conductor of subscriber loop 26A to line coupler 158A. The magnetic coupling between inductor L162 and inductor L160 allows the Rx+ signal to be transmitted to connection LA+. In one system employing MVL transceiver 60, the connection LA+ is coupled to a receive line selector 174. The Rx+ signal associated with customer premises 24A (FIG. 3) is then passed to MVL transceiver 60 receiver 144 over connection 176 in a manner described hereinafter. Similarly, a negative receive signal (Rx–) is delivered over the ring conductor of subscriber loop 26A to the line coupler 158A. Rx– is transmitted to connection LA– through the magnetic coupling between inductor L166 and inductor L160. Receive line selector 174 then passes the Rx– signal to MVL transceiver 60 receiver 144 over connection 178 in a manner described hereinafter. In a similar manner, line couplers 158B–158D receive Rx+ and Rx– signals from customer premises 24B–24D, respectively, and deliver the Rx+ and Rx– signals to receiver 144.

4. Operation of the Amplifier-Based Coupler on Leakage Signals

The output of the first amplifier 152 is coupled to the negative input of amplifier 152 via connection 180 such that amplifier 152 is coupled in a negative feedback amplifier configuration. Similarly, the output of amplifier 154 is coupled to the negative input of amplifier 154 via connection 182 such that amplifier 154 is configured as a negative feedback amplifier. The above-described configuration of amplifiers 152 and 154 as negative feedback amplifiers creates a nearly-zero amplifier output impedance path between connections 156 and 164, respectively. For example, a leakage signal 80 (FIG. 4B) associated with a POTS telephone conversation originating on subscriber loop 26A will be significantly attenuated by the nearly-zero output impedance of amplifiers 152 and 154. Thus, a leakage signal originating on subscriber loop 26A will not substantially appear on subscriber loops 26B, 26C and/or 26D.

5. Amplifier-Based Coupler Amplifier

One skilled in the art should appreciate that the size and/or power rating of amplifiers 152 and 154 should be based upon the needs of the MVL transceiver 60 which are required to operate in telephony system 20". Amplifiers 152 and 154 may be conveniently selected from a plurality of standardized parts to economically facilitate manufacturing and assembly. Or, amplifiers 152 and 154 may be specially fabricated amplifiers or similar electrical devices which perform substantially the same functionality of amplifiers 152 and 154. As mentioned above, amplifiers 152 and 154 may be configured to amplify a voltage signal received from transmitter 140, or configured to amplify a current signal received from transmitter 140. Such components may be used in an amplifier-based coupler so long as the above-described nearly-zero impedance path is provided. Such variations in the amplifier-based coupler 146 may be implemented without departing substantially from the spirit and principles of the present invention. All such modifications and variations of an amplifier-based coupler 146 are intended to be included herein within the scope of this disclosure and be protected by the accompanying claims for the amplifier-based coupler 146.

The embodiment of the amplifier-based coupler 146 shown in FIG. 10, illustrates the amplifier-based coupler 146 being a separate stand-alone component. Alternative embodiments of the amplifier-based coupler 146 may be incorporated into MVL transceiver 60 as an integral component. Furthermore, line couplers 158A–158D are shown to be stand-alone components. An alternative embodiment of the amplifier-based coupler 146 could combine the elements of the amplifier-based coupler 146 and line couplers 158A–158D into a single stand-alone unit or into an integral part of MVL transceiver 60. Any such alternative embodiments of the amplifier-based coupler 146 may be implemented as described above without departing substantially from the spirit and principles of the present invention. All such modifications and variations are intended to be included herein within the scope of this disclosure and be protected by the accompanying claims for the amplifier-based coupler 146.

6. Receive Line Selector

Figure 11:
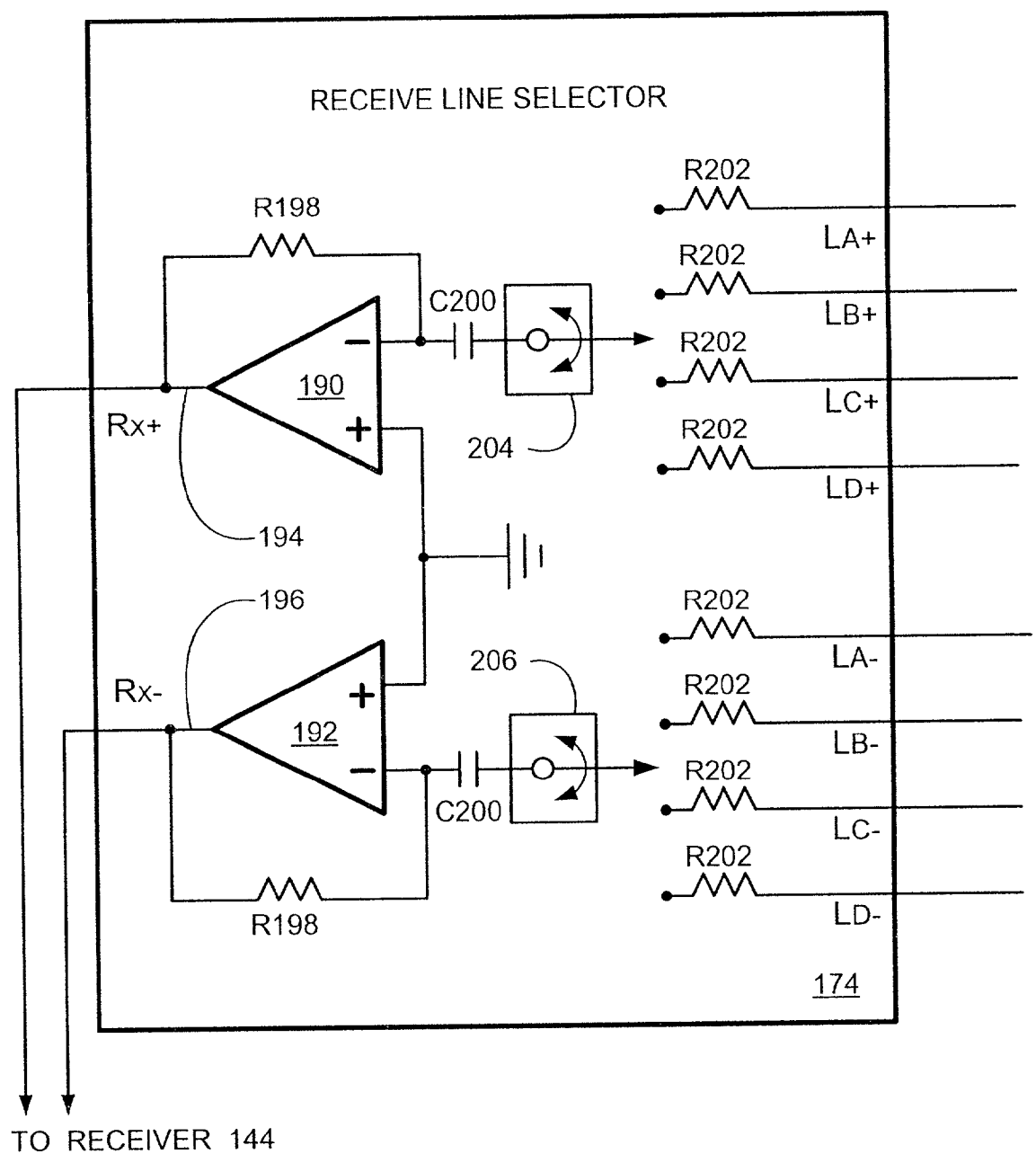
FIG. 11 is a block diagram illustrating a more detailed view of the receive connection selector shown in FIG. 10.

FIG. 11 illustrates one possible configuration of the receive connection selector 174. For convenience of illustration, the line couplers 158A–158D (not shown) would be coupled to receive connection selector 174 at connection points LA+ to LD+, and LA– to LD–, in a manner illustrated for line couplers 158A and 158D in FIG. 10. Thus, the preferred embodiment of the amplifier-based coupler 146 is also effectively coupled to receive connection selector 174. A detailed description of the operation of the receive connection selector 174 and the associated components within receive connection selector 174 is not provided herein other than to the extent necessary to understand the operation and functioning of the receive connection selector 174 and the associated components with respect to the operation and functioning of the amplifier-based coupler 146. One skilled in the art should realize that receive connection selector 174, or a similar device, may have components configured differently than shown in FIG. 11, may not include all of the components shown in FIG. 11, or may include additional components connected in some other manner with the components shown in FIG. 11. Furthermore, alternative embodiments of amplifier-based coupler 146 (FIG. 10) may be able to perform and operate satisfactorily in the absence of a receive connection selector 174. For example, receive connection selector 174 may be omitted, and connection impedances might be employed to create a higher impedance path which prevents a leakage signal 80 (FIG. 4B) from propagating from one communication connection to another communication connection. Any such variations in a receive connection selector 174 or similar device which is employed along with an amplified-based coupler 146 are intended to be within the scope of this disclosure.

Receive connection selector 174, as shown in FIG. 11, has a first amplifier 190 and a second amplifier 192 such that a positive receive signal from connections LA+, LB+, LC+ and/or LD+ are amplified by amplifier 190 such that the output of amplifier 190 provides an amplified signal Rx+ that is of the appropriate amplitude which may be detected by MVL transceiver 60 receiver 144. Likewise, a negative receive signal from connections LA−, LB−, LC− and/or LD− are amplified by amplifier 192 and output via connection 196 to the MVL transceiver receiver 144. Other resistive, capacitive and inductive components are included in receiver connection selector 174 (R198, C200, R202).

A selector 204 is coupled to amplifier 190. Selector 204 selects the appropriate connection LA+, LB+, LC+ or LD+ such that the amplified Rx+ signals from customer premises 24A–24D (FIG. 3) may be properly detected and transmitted to receiver 144 (FIG. 10). Similarly, selector 206 is coupled to amplifier 192. Selector 206, in a manner similar to selector 204, selects the appropriate connection LA−, LB−, LC− or LD− such that the Rx− signal can be transmitted to receiver 144 (FIG. 10). The operation and control of selectors 204 and 206, which is determined based upon the particular signal modulation scheme employed by the MVL transceiver 60 (FIG. 10), is well understood in the art and is not described in detail herein except to the extent necessary to understand the operation and functioning of the amplifier-based coupler 146. That is, the nearly-zero impedance path associated with the amplifier-based coupler 146 effectively shunts the leakage signal 80, substantially preventing leakage signals from propagating onto other subscriber loops.

With respect to the operation of the receive line selector 174, the impedances associated with switches 204 and 206, and with R202, are such that a leakage signal 80 (FIG. 4B) would not be transmitted from one subscriber loop to another subscriber loop. Rather, any leakage signal 80 would be substantially attenuated by the above-mentioned nearly-zero impedance path associated with the amplifier-based coupler 146

7. Amplifier-Based Coupler First Alternative Embodiment

Figure 12:
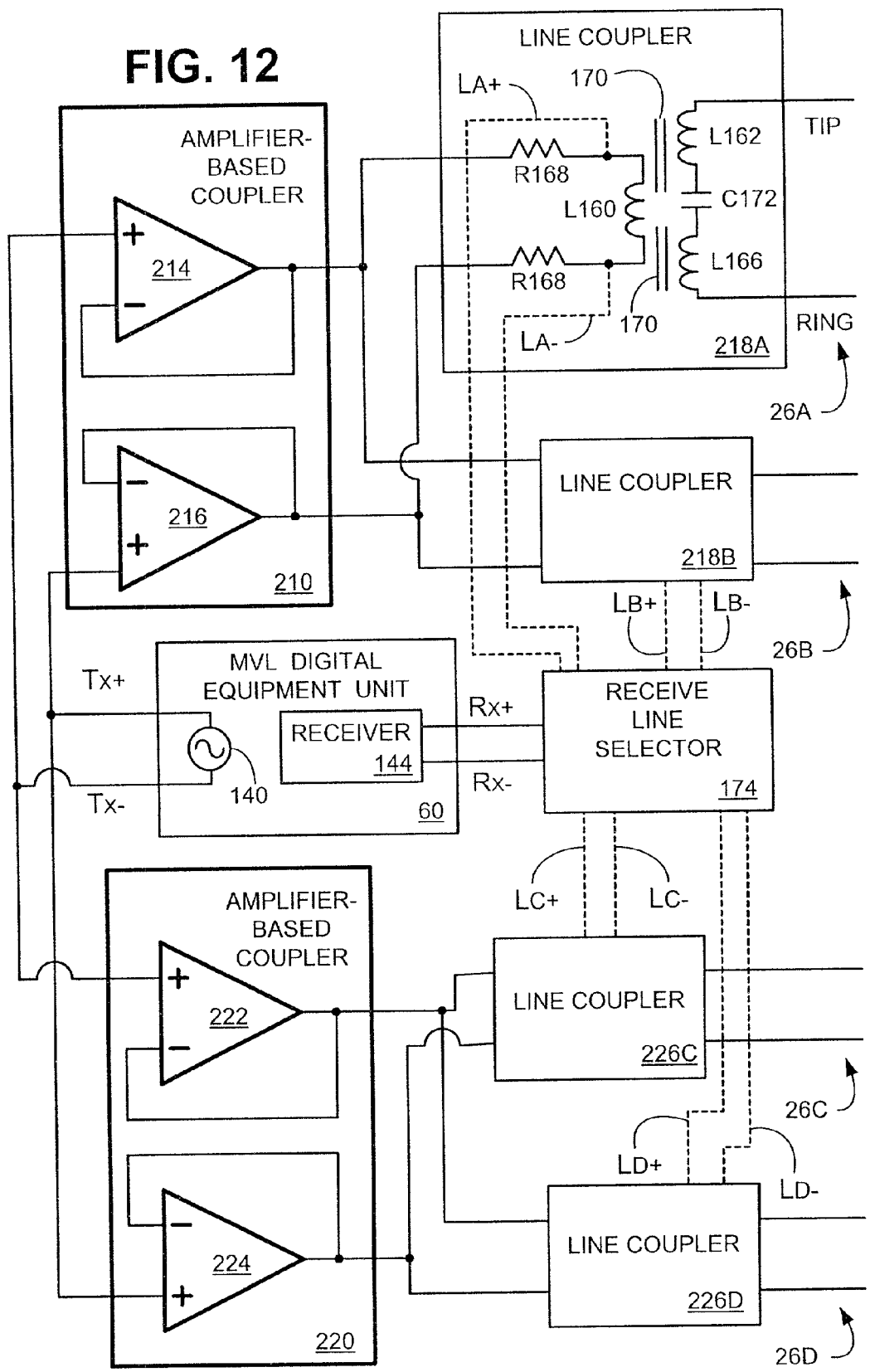
FIG. 12 is a block diagram illustrating an alternative embodiment of the amplifier-based coupler of FIG. 10.

FIG. 12 illustrates an alternative embodiment of an amplifier-based coupler system and method employing two amplifier-based couplers 210 and 220. Amplifier-based coupler 210 employs a first amplifier 214 and a second amplifier 216 which amplify the Tx+ signal and Tx− signal, respectively, received from the transmitter 140 residing in MVL transceiver 60. The amplified Tx+ and Tx− signals from amplifier-based coupler 210 are transmitted to line coupler 218A and line coupler 218B such that the Tx+ signal and Tx− signal are transmitted to customer premises 24A and 24B over subscriber loops 26A and subscriber loop 26B, respectively. Elements within line coupler 218A that are similar to the elements in line coupler 158A (FIG. 10) bear the same reference numerals as the elements of line coupler 158A. These like numeraled elements bear the same reference numerals for convenience of illustration and explanation, and may be considered to be like elements. However, since these like numeraled elements are incidental to the operation of the amplifier-based coupler 210, one skilled in the art should realize that the elements in line coupler 218A and line coupler 158A (FIG. 10) need not be identical, as any variations of such elements will not adversely affect the functioning and performance of the amplifier-based coupler 210.

Similar to the amplifier-based coupler 146 (FIG. 10), the amplifiers 214 and 216 of the amplifier-based coupler 210 are configured as negative feedback amplifiers. Thus, a nearly-zero impedance path through the amplifier-based coupler 210 is present such that leakage signals will not be transmitted from subscriber loop 26A to subscriber loop 26B, or be transmitted to subscriber loop 26B to subscriber loop 26A. One skilled in the art will appreciate that the amplifier-based coupler 210 embodiment differs primarily from the amplifier-based coupler 146 (FIG. 10) in that amplifiers 214 and 216 are driving communication signals (Tx+ and Tx−) onto only two subscriber loops (26A and 26B).

A second amplifier-based coupler 220, employing a first amplifier 222 and a second amplifier 224, amplifies and transmits signals Tx+ and Tx− to subscriber loops 26C and 26D through line couplers 226C and 226D, respectively, in a like-manner described above for amplifier-based coupler 210. Thus, leakage signals from subscriber loop 26C do not propagate onto subscriber loop 26D, or leakage signals from subscriber loop 26D do not propagate onto subscriber loop 26C, because the leakage signal passes over the nearly-zero impedance path associated with amplifiers 222 and 224 of the amplifier-based coupler 220.

Leakage signals associated with POTS conversations at customer premises 24A–26D will be significantly attenuated by the nearly-zero output impedance of amplifiers 214, 216, 222 and 224. Thus, leakage signals will not substantially appear on other subscriber loops.

Line couplers 218A, 218B, 226C and 226D are coupled to receive connection selector 174. The operation and functionality of receive connection selector 174 is described above in association with FIG. 11 and is not described in detail again. With the embodiment of the amplifier-based coupler system and method shown in FIG. 12, the impedances (not shown) associated with the receive connection selector 174 prevent the passage of a leakage signal from one subscriber loop to another subscriber loop in the manner described hereinabove.

8. Amplifier-Based Coupler Alternative Embodiments

One skilled in the art will appreciate that any number of subscriber loops may be coupled to MVL transceiver 60 or similarly functioning communication device. The maximum number of subscriber loops being coupled is determined by the signal power requirements of the communication system and the signal multiplexing technology employed by the MVL transceiver 60 or similarly coupled communication device. Similarly, amplifier-based couplers constructed in accordance with the system and method of the present invention may be coupled to any number of subscriber loop line couplers. The number of subscriber loops coupled to a single amplifier-based coupler would be determined based upon the amplification capacity of the amplifiers employed in the amplifier-based coupler and the signal power requirements. Furthermore, an amplifier-based coupler employing the system and method of the present invention might employ one amplifier, or more than two amplifiers, which are configured to couple MVL transceiver 60 or another communication device to a communication connection such as, but not limited to, a subscriber loop.

In some applications, line couplers may be incorporated into other devices, or may not be required at all. In communication systems in which a line coupler is not employed, an impedance may be added to create a higher impedance path such that a leakage signal does not propagate onto the communication connection. Alternatively, a communication system not employing line couplers may have communication connections having sufficiently high inherent impedance such that a leakage signal will not be detectable on the communication connection. In these alternative embodiments, the amplifier-based coupler would be configured to have a nearly-zero impedance path such that a leakage signal will be substantially attenuated by the amplifier-based coupler and not pass onto the communication connections.

Any such variations and modifications of an amplifier-based coupler in accordance with the system and method of the present invention, may be implemented without departing substantially from the spirit and principles of the amplifier-based coupler. Any such alternative embodiments of an amplifier-based coupler system and method are intended to be within the scope of this disclosure and be protected by the accompanying claims for the amplifier-based coupler.

Figure 13B:
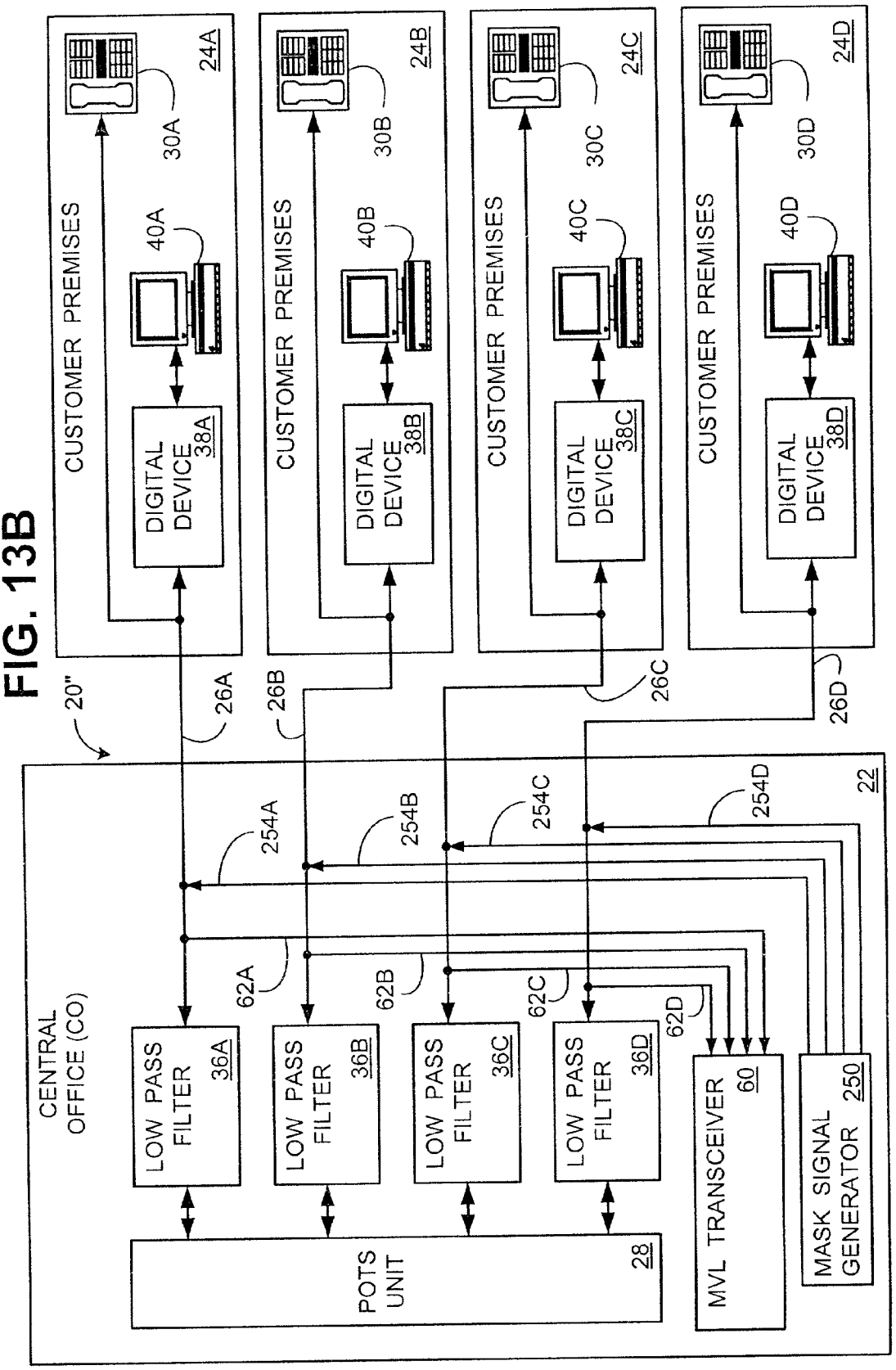
FIG. 13B is a block diagram illustrating an alternative configuration of the mask signal generator.

D. Third Embodiment of the Eavesdropping Prevention System and Method: A Connection Sharing Multipoint POTS Splitter with a Mask Signal Generator 1. Mask Signal Generator Overview FIGS. 13A and 13B illustrate a portion of a telephony system 20" (see also FIG. 3) employing the third embodiment of the eavesdropping prevention system and method, a connection sharing multipoint POTS splitter with a mask signal generator, hereinafter referred to as a mask signal generator for convenience. With this preferred embodiment in accordance with FIG. 13A, a mask signal generator 250 is disposed such that a mask signal 256 (FIG. 14), as described hereinafter, is transmitted onto connections 62A–62D via connection 252. Alternatively, as shown in FIG. 13B, mask signal 256 (FIG. 14) is transmitted onto subscriber loops 26A–26D via connections 254A–254D, respectively.

Elements in FIGS. 13A and 13B that are similar to elements in FIGS. 1–4 bear the same reference numerals. Such elements having the same reference numerals in FIGS. 1–3, 13A and 13B may be considered to be like elements. However, since these like numeraled elements are incidental to the operation of the mask signal generator 250 which utilizes existing portions of telephony system 20", one skilled in the art should realize that elements in FIGS. 1–3, 13A and 13B need not be identical, as any variations of such elements will not adversely effect the functioning and performance of the mask signal generator 250 as described hereinafter. Therefore, like elements which are like-numbered will not be described again in detail. MVL transceiver 60 is used for convenience of illustration. The mask signal generator 250 will work equally well with any similarly functioning communication device or other communication devices wherein a plurality of communication connections are coupled together such that leakage signals may propagate onto the commonly coupled communication connections. It is intended that all such additional systems and communication devices employing the mask signal generator 250 be included within the scope of this disclosure and be protected by the accompanying claims for the mask signal generator 250.

2. Mask Signal Generator

As shown in FIG. 13A, mask signal generator 250 generates a mask signal 256 (FIG. 14) which is transmitted onto connections 62A–62D via connection 252. FIG. 13B shows an alternative embodiment of the mask signal generator 250 in that the mask signal 256 (FIG. 14) is transmitted onto subscriber loops 26A–26D directly via connections 254A–254D, respectively.

Figure 14:
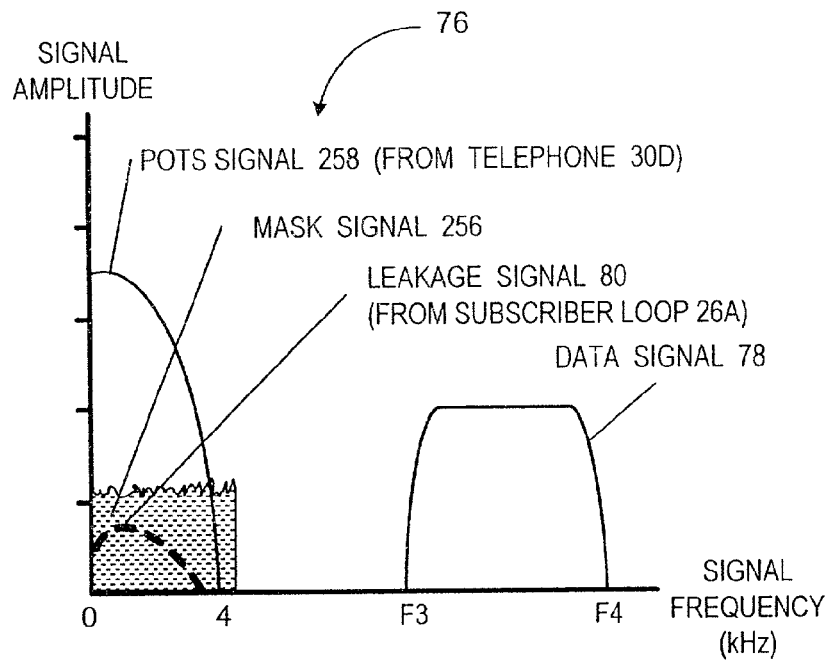
FIG. 14 is a graphical representation of the available communication signal frequency spectrum associated with subscriber loop 26D of FIGS. 13A and/or 13B illustrating how the mask signal generated by the mask signal generator of FIGS. 13A and/or 13B effectively masks a leakage signal.

FIG. 14 is a simplified illustrative example of a mask signal 256, generated by the mask signal generator 250 (FIGS. 13A and 13B), which has been transmitted onto connections 62A–62D (FIG. 13A) via connection 252 (FIG. 13A), or, which has been transmitted onto subscriber loops 26A–26D (FIG. 13B) via connections 254A–254D, respectively (FIG. 13B). FIG. 14 illustrates the available communication system frequency spectrum 76 on subscriber loop 26D (FIGS. 13A and 13B). This FIG. 14 corresponds to the available communication system frequency spectrum 76 for subscriber loop 26D (see also FIG. 4B). Elements in FIG. 14 that are similar to those in FIG. 4B bear the same reference numerals. Such elements having the same reference numerals in FIGS. 4B and 14 may be considered to be like elements, however, since these like numeraled elements are incidental to an explanation of the operation of the mask signal 256, one skilled in the art should realize that the elements in FIGS. 4B and 14 need not be identical, as any variations of such elements will not adversely affect the functioning and performance of this third embodiment of the eavesdropping prevention system and method, the mask signal generator 250 (FIGS. 13A and 13B). Therefore, like elements which are like-numbered will not be described again in detail.

A leakage signal 80, represented as a bold-dashed line in FIG. 14 in this simplified illustrative example, is associated with an analog POTS signal communicated over subscriber loop 26A from a person using telephone 30A (FIGS. 13A and 13B). A portion of the analog POTS signal (not shown) transmitted over subscriber loop 26A, propagates onto subscriber loop 26D, thereby creating leakage signal 80 in a manner as described hereinabove.

Additionally, a POTS signal 258 is shown in FIG. 14. POTS signal 258 corresponds to a telephone conversation by a person at customer premises 24D who is using telephone 30D (FIGS. 13A and 13B). POTS signal 258 is transmitted over subscriber loop 26D (FIGS. 13A and 13B). As illustrated in FIG. 14, the amplitude of leakage signal 80 is significantly less than the amplitude of POTS signal 258 such that leakage signal 80 does not interfere significantly with POTS signal 258. That is, leakage signal 80 should not significantly interfere with telephone conversations on subscriber loop 26D (FIGS. 13A and 13B). However, as described hereinabove, the amplitude of leakage signal 80 may be such that an eavesdropper might detect and amplify leakage signal 80, and thus, eavesdrop on the phone conversation from a person talking on telephone 30D.

Also shown in the simplified illustrative example of FIG. 14 is data signal 78. As described hereinabove, data signal 78 is the signal transmitted/received by PC 40D over subscriber loop 26D (FIGS. 13A and 13B). Data signal 78 occupies a portion of the available frequency spectrum from a frequency of F3 to F4, and thus, is seen to occupy a separate portion of the available communication system frequency spectrum 76 than the portion of the frequency spectrum utilized by POTS signal 258 (and also leakage signal 80).

Mask signal generator 250 (FIGS. 13A and 13B) generates mask signal 256 and transmits the mask signal 256 onto connection 62 (FIG. 13A) or directly onto subscriber loops 26A–26D (FIG. 13B). In the preferred embodiment, the amplitude of mask signal 256 is pre-determined such that the amplitude of mask signal 256 is greater than or at least equal to leakage signal 80. The amplitude of mask signal 256 should not substantially exceed the noise floor level of POTS signals at CO 22. Also, the frequency range of mask signal 256 is predefined to substantially correspond to the frequency range of leakage signal 80. In the preferred embodiment, the frequency range of mask signal 256 has been predefined to be from 0 KHz to a frequency substantially equal to or greater than the 4 KHz upper frequency bandwidth of a typical analog POTS signal, such as, POTS signal 258. Thus, one skilled in the art would appreciate that a potential eavesdropper having access to subscriber loop 26D, or customer premises 24D, or CO 22, would not be able to detect and amplify leakage signal 80. That is, mask signal 256 effectively masks over leakage signal 80 such that leakage signal 80 cannot be detected and amplified by the potential eavesdropper.

Mask signal 256, as shown in FIG. 14, is shown to be a constant amplitude noise signal. Mask signal 256 is illustrated as shown in FIG. 14 for illustrative convenience and to facilitate an explanation of the effect of mask signal 256 on the detectability of leakage signal 80. One skilled in the art will appreciate that mask signal 256 may be of any suitable signal type which interferes with the detection of leakage signal 80. One non-limiting example of mask signal 256 would be a constant amplitude, white-noise signal.

3. Mask Signal Generator Control and Operation

Figure 15:
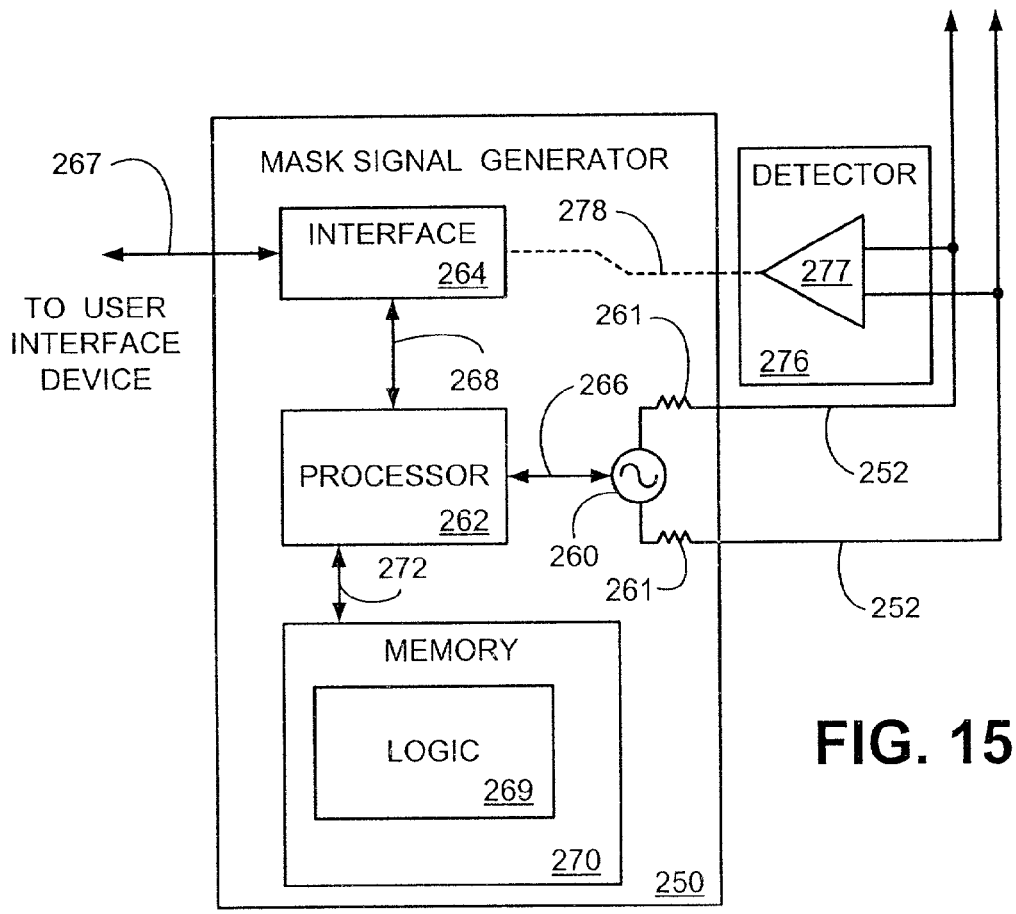
FIG. 15 is a block diagram illustrating components employed in an embodiment of the mask signal generator of FIGS. 13A and/or 13B.

FIG. 15 is a simplified illustrative block diagram of a preferred embodiment of the mask signal generator 250 (see also FIGS. 13A and 13B). Components of the mask signal generator 250 includes at least a signal generator 260, a processor 262 and an interface 264. As is well known in the art, signal generators and signal generator control systems typically contain many individual components aggregated together. However, these other associated elements are not relevant to an explanation of the mask signal generator 250, and as such, only those components relevant to the functioning of the mask signal generator 250 of the present invention are described herein. Processor 262 controls the signal generator 260 via connection 266. Logic 269 which controls processor 262 may be provided by a user through interface 264 via connections 267 and 268 and stored in memory 270 via connection 272. A user may be in communication with user interface 264 via connection 272 to provide logic 269 that controls processor 262. In the preferred embodiment of mask signal generator 250, a user may specify the desired amplitude and frequency characteristics of the mask signal 256 (FIG. 14) which is to be transmitted into connection 62 (FIG. 13A) or directly onto subscriber loops 26A–26D (FIG. 13B).

The signal generator 260 illustrated in FIG. 15 generates mask signal 256 onto two connections 252 through a high impedance source (to prevent loading of connection pair 252). Resistors 261, in series with signal generator 260 providing a voltage-based mask signal 256 (FIG. 14), is one method of creating a high source impedance. Alternatively, signal generator 260 could be a current source, in which case resistors 261 may not be necessary. The two connections 252 of FIG. 15 correspond to the single connection 252 of FIG. 13A, which is shown as a single connection in FIG. 13A for convenience of illustration. As mentioned hereinabove, one skilled in the art should realize that typical telephony systems are two conductor systems which may be equivalently represented by two connections or by a single (pair) connection, depending on the nature and purpose of the block diagram illustration employed. Alternatively, connections 252 in FIG. 15 could have been labeled with reference numerals 254A–254D to correspond with the four connections 254A–254D of FIG. 13B which couple the mask signal generator 250 directly to subscriber loops 26A–26D.

4. Alternative Embodiments Employing a Detector

FIG. 15 illustrates the use of a detector 276 with mask signal generator 250. Detector 276 could be used with an alternative embodiment of mask signal generator 250 such that detector 276 detects the presence of a leakage signal 80 (FIG. 14) and indicates the presence of the leakage signal 80 to the mask signal generator 250. In the embodiment illustrated in FIG. 15, detector 276 includes a high-input instrumentation amplifier (IA) 277 that can unobtrusively monitor the signals across connection pair 252. Detector 276 could be further configured to provide an amplifier and/or band filtered replica of any detected signals. For convenience of illustration, connection 278 is shown to couple detector 276 with interface 264 such that the presence of a leakage signal 80 detected by detector 276 may be communicated to mask signal generator 250. Connection 278 could alternatively have been coupled to alternative elements within mask signal generator 250, such as to processor 262. Any suitable detector 276 which detects leakage signal 80 may be employed with a mask signal generator 250 without departing substantially from the spirit and principles of the present invention. Furthermore, detector 276 may reside in any convenient location as a stand-alone unit, be incorporated with other electrical equipment, or be incorporated as an integral component of a mask signal generator 250, without adversely affecting the functionality of the mask signal generator 250 which employs a detector 276. Any such alternative embodiments of the detector methods and apparatus so employed are intended to be within the scope of this disclosure and be protected by the accompanying claims for a mask signal generator 250.

5. Alternative Embodiments of a Mask Signal Generator

The mask signal generator 250, as illustrated in FIGS. 13A and 13B, is shown residing as a stand alone component residing in CO22. Such a mask signal generator 250 may be located in other convenient locations. Mask signal generator 250 could also be implemented as a part of MVL transceiver 60 or in another physical device not shown in FIG. 13. Any such variation in location of the mask signal generator 250 could be implemented without departing substantially from the spirit and principles of the mask signal generator 250 of the present invention. It is intended that all such variations be included herein within the scope of this disclosure and be protected by the accompanying claims for the mask signal generator of the present invention.

As illustrated in FIG. 13B, mask signal generator 250 is transmitting the mask signal 254 (FIG. 14) into connections 254A–254D. The mask signal 254 could be transmitted into alternative locations and perform equally well at masking a leakage signal 80. For example, a mask signal generator 250 may generate a mask signal into a plurality of connections such that the plurality of connections could be coupled in convenient locations to introduce the mask signal 256 (FIG. 14) into the telephony system 20". In this instance, a plurality of output connections could be coupled to a plurality of subscriber loops coupled to a MVL transceiver 60 (FIGS. 13A and 13B) or other communication device which is communicating with less than the four subscriber loops, or more than the four subscriber loops. Furthermore, a single mask signal generator 250 may transmit a mask signal 256 onto a plurality of subscriber loops which may be coupled to more than one MVL transceiver 60 or other communication device. Any such variations and modifications in a mask signal generator 250 are intended to be within the scope of this disclosure for a mask signal generator 250 and be protected by the accompanying claims for the mask signal generator 250.

An alternative embodiment of mask signal generator 250 may be constructed without the inclusion of interface 264, processor 262 and memory 270. Such a mask signal generator 250 may employ a signal generator 260 having a predetermined fixed amplitude and a predetermined fixed frequency range. Alternatively, a signal generator 260 may have an adjustable amplitude and/or frequency ranges. Such adjustments could be provided by any commonly employed apparatus, means or method employed in the art of adjusting signals generated by signal generators. Any such alternative embodiments of a mask signal generator 250 employing the above-mentioned variations in a signal generator are intended to be within the scope of this disclosure and be protected by the accompanying claims for a mask signal generator 250.

6. Embodiments Employing Software with Logic Executed by a Processor

The logic 269 (FIG. 15) of the mask signal generator can be implemented in =software, hardware, or a combination thereof. Portions of the mask signal generator may be implemented in software that may be stored in a memory 270 (FIG. 15) and that is executed by a suitable microprocessor (uP) situated in a personal computer (PC), workstation or other convenient location, or by processor 262 residing in mask signal generator 250 (FIG. 15). However, instructions defining the software portion of the mask signal generator, which each comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

7. Alternative Embodiments of a Mask Signal

Figure 16A:
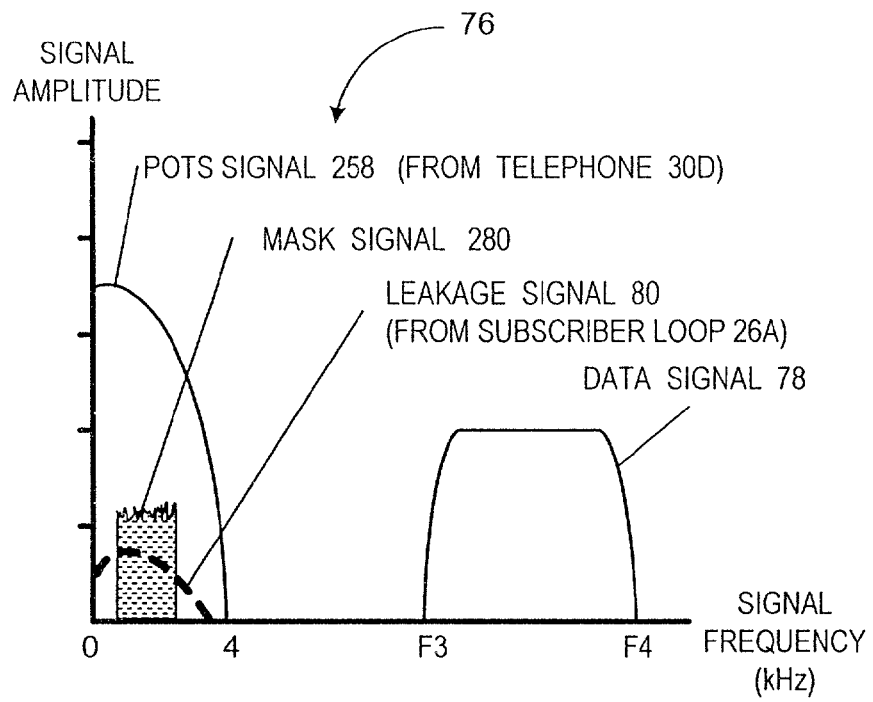
FIGS. 16A–16C are graphical representations of the available communication frequency spectrum associated with subscriber loop 26D of FIGS. 13A and/or 13B illustrating possible variations in the mask signal of FIG. 14.
Figure 16B:
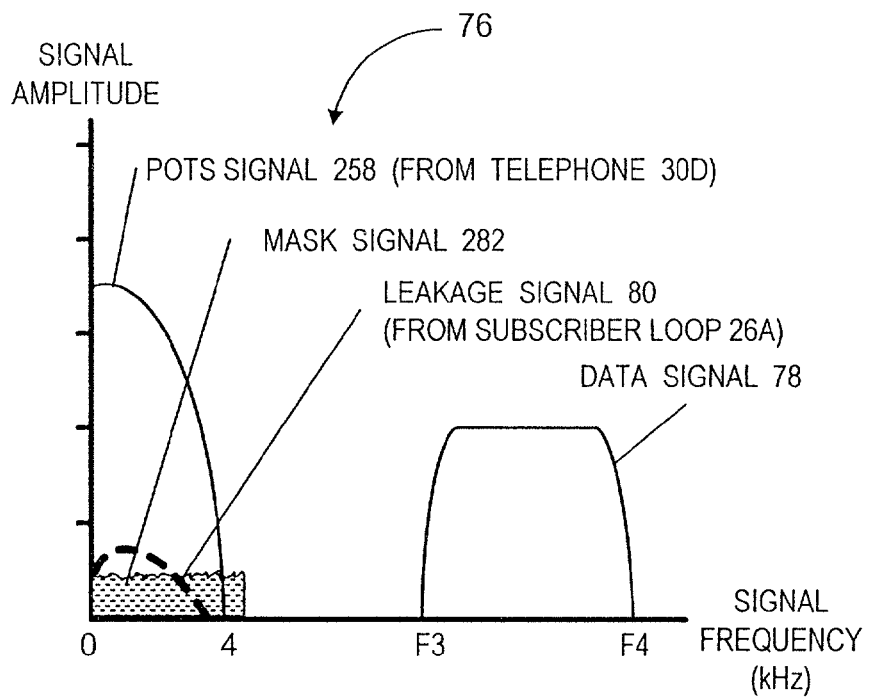
Figure 16C:
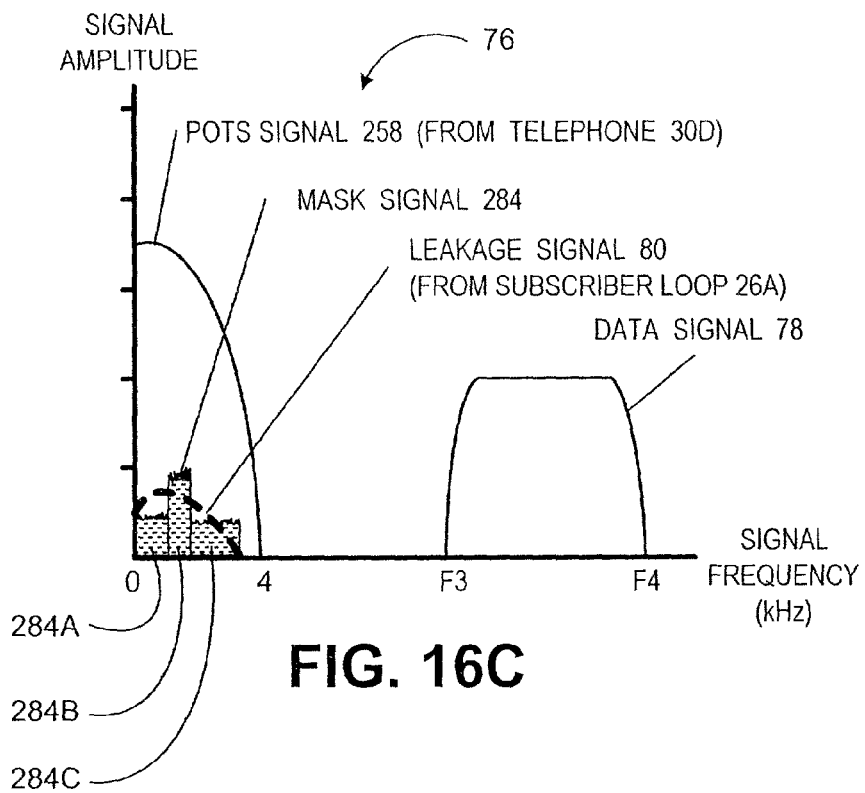

FIGS. 16A–16C illustrate three possible alternative mask signals generated by alternative embodiments of a mask signal generator 250 (FIGS. 13A, 13B and 15). Any number of possible variations in a mask signal may be generated by mask signal generator 250. Such a multitude of possible variations in a mask signal cannot be conveniently described or illustrated herein. These numerous various alternative embodiments of a mask signal would each have the functionality of preventing the meaningful detection and amplification of leakage signals. It is intended that all such variations in a mask signal be included within the scope of this disclosure and be protected by the accompanying claims for the mask signal generator 250.

Signals and/or signal features shown in FIGS. 16A–16C may correspond to signals and/or signal features shown in FIG. 14. For convenience of illustration, signals and/or signal features in FIGS. 16A–16C that are similar to those in FIG. 14, bear the same reference numerals. Such signals and/or signal features having the same reference numerals in FIGS. 16A–16C and FIG. 14 may be considered to be like signals and/or like signal features, however, since these like numeraled signals and/or signal features are incidental to the operation of the present invention, one skilled in the art should realize that signals and/or signal features in FIGS. 16A–16C and FIG. 14 need not be identical, as any variations of such signals and/or signal features will not adversely affect the functioning and performance of the present invention. Therefore, like signals and/or signal features are like-numbered and will not be described again in detail.

FIG. 16A illustrates one possible alternative embodiment of a mask signal 280. Mask signal 280 encompasses only a portion of the frequency range of leakage signal 80. Also, mask signal 280 encompasses a sufficiently broad range of frequency such that leakage signal 80 is rendered substantially undetectable. As shown in FIG. 16A, portions of leakage signal 80 are not masked. These unmasked portions of leakage signal 80 are difficult to meaningfully detect and amplify by a potential eavesdropper.

FIG. 16B illustrates another possible alternative embodiment of a mask signal 282. Here, the amplitude of mask signal 282 is not as great as the amplitude of portions of leakage signal 80. However, a sufficient portion of leakage signal 80 is masked by mask signal 282 such that leakage signal 80 is difficult to meaningfully detect and amplify by a potential eavesdropper.

FIG. 16C illustrates yet another possible alternative embodiment of a mask signal 284. Mask signal 284 includes portions of the mask signal 284*a–c* which may vary in amplitude and/or frequency. For convenience of illustration, mask signal 284 is shown having three portions, 284*a*, 284*b* and 284*c*. The first portion, 284*a*, is seen to have an amplitude slightly less than the corresponding portion of leakage signal 80. The middle portion, 284*b*, is seen to have a greater amplitude than the corresponding portion of leakage signal 80. The third portion, 284*c*, is seen to have an amplitude such that the part is less than and another part is greater than the corresponding portion of leakage signal 80. In totality, the mask signal 284 has been generated such that leakage signal 80 is difficult to meaningfully detect and amplify by a potential eavesdropper.

Mask signal 284 may have more than, or less than, the three portions of mask signal 284 as illustrated in 16C. Furthermore, any portion of mask signal 284 may have amplitudes less than, equal to, or greater than the corresponding portion of leakage signal 80. Mask signal 284 may be constructed with any plurality of portions such that the mask signal 284 generated is such that leakage signal 80 is difficult to meaningfully detect and amplify by a potential eavesdropper. Any variations and modifications in a mask signal 284 are intended to be within the scope of this disclosure for a mask signal generator 250 and be protected by the accompanying claims for the mask signal generator 250.

As seen in FIGS. 16A–16C, the mask signal 280, 282 and 284, respectively, have a higher frequency limit which is less than the lower frequency F3 of data signal 78. Thus, the mask signals 280, 282 and 284 do not significantly interfere with the transmission of data signal 78. Also, the maximum amplitude of mask signals 280, 282 and 284 are sufficiently lower than POTS signal 258 (which corresponds to telephone conversations on telephone 30D of FIGS. 13A and 13B). Thus, mask signals 280, 282 and 284 do not significantly interfere with POTS signal 258.

Figure 17:
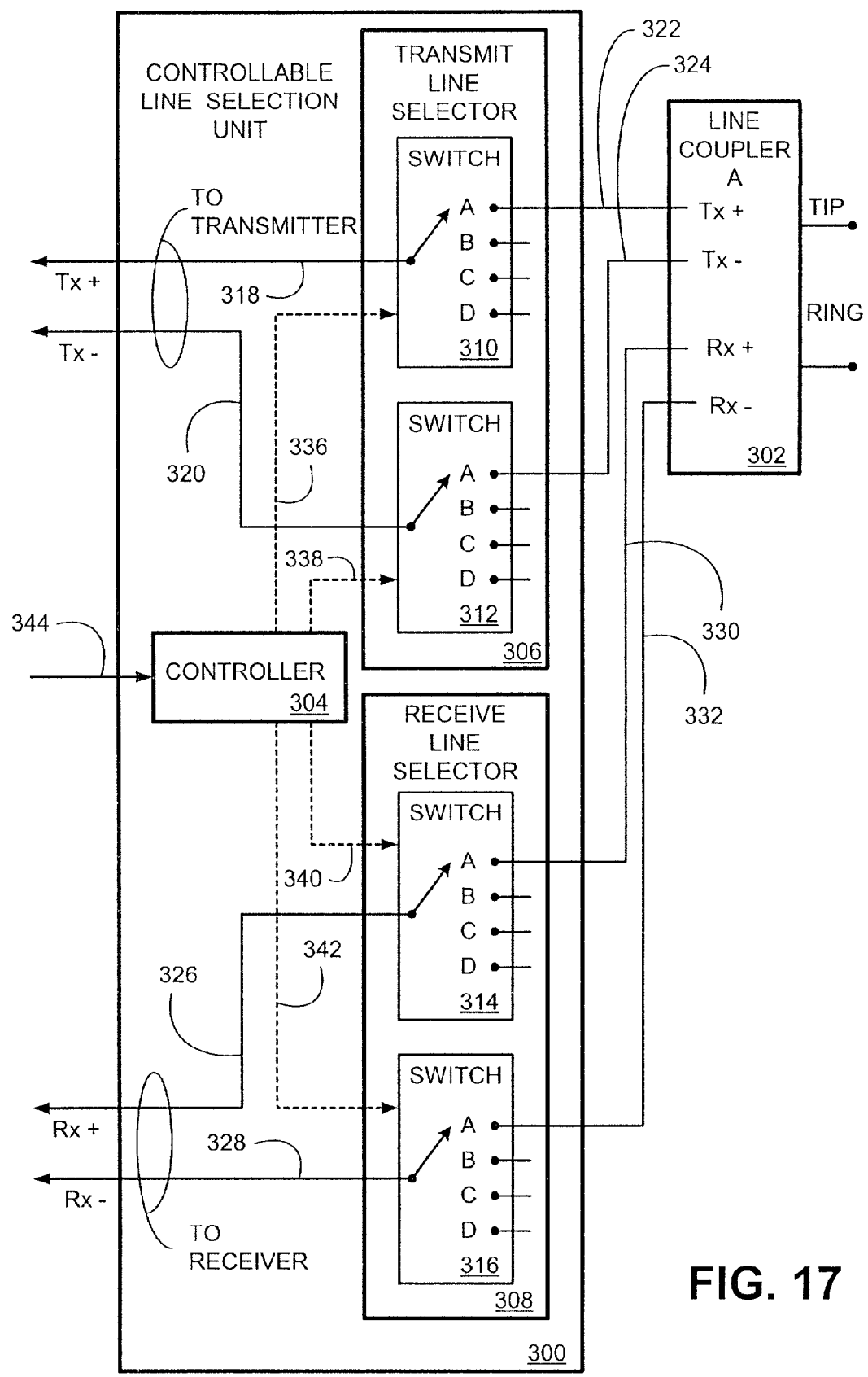
FIG. 17 illustrates a controllable line selection unit coupled to one line coupler.

E. Fourth Embodiment of the Eavesdropping Prevention System and Method: A Multipoint Controllable Line Selection System 1. Controllable Line Selection Unit FIG. 17 illustrates a controllable line selection unit 300 coupled to one line coupler 302, hereinafter referred to as line coupler A for convenience. Line coupler A may be configured substantially according to the previously described line coupler 218A (FIG. 12). Alternatively, line coupler A may be configured according to any coupling device used to couple a multi-point transceiver (not shown) to a subscriber loop (not shown), thereby providing connectivity back to a customer premises (not shown). Controllable line selection unit 300 has at least a controller 304, a transmit line selector 306 and a receive line selector 308. Transmit line selector 306 has at least two switches 310 and 312. Similarly, the receive line selector 308 has at least two switches 314 and 316.

Controllable line selection unit 300 is coupled to a transmitter (not shown) residing in an MVL transceiver (not shown) or similarly functioning communication device. Connection 318 couples the controllable line selection unit 300 to the MVL transceiver terminal which transmits the positive transmit signal (Tx+). Connection 318 is coupled to the input of switch 310. Similarly, connection 320 couples the controllable line selection unit 300 to the negative transmit signal (Tx−) terminal of the MVL transceiver by connecting to the input of switch 312. The controllable line selection unit 300 is coupled to the line coupler A via connections 322 and 324. Connection 322 couples the output position A on switch 310 to the Tx+terminal of line coupler A. Connection 324 couples the output position A of switch 312 to the Tx− terminal of line coupler A.

Also, controllable line selection unit 300 is coupled to a receiver (not shown) residing in an MVL transceiver (not shown) or similarly functioning communication device. Connection 326 couples the controllable line selection unit 300 to the MVL transceiver terminal which receives the positive receive signal (Rx+). Connection 326 is coupled to the input of switch 314. Similarly, connection 328 couples the controllable line selection unit 300 to the negative receive signal (Rx−) terminal of the MVL transceiver by connecting to the input of switch 316. The controllable line selection unit 300 is coupled to the line coupler A via connections 330 and 332. Connection 330 couples the output position A on switch 314 to the Rx+ terminal of line coupler A. Connection 332 couples the output position A of switch 316 to the Rx− terminal of line coupler A.

Controller 304 provides switch position control signals to switches 310, 312, 314 and 316 such that one of a plurality of desired output positions is actuated within the switches. For convenience of illustration in FIGS. 17–19, and for convenience of explaining the operation and functionality of the control line selection unit 300 and its associated elements, four output positions A, B, C and D are shown residing in switches 310, 312, 314 and 316. The operation and functionality of the present invention is equally applicable to a control line selection unit having two, three or more than four output positions residing in the switches. Any such alternative embodiments of a controllable line selection unit 300 are intended to be within the scope of this disclosure and to be protected by the accompanying claims for the control line selection unit.

Controller 304 provides the switch position control signal to switch 310 via connection 336. Similarly, controller 304 provides a switch position control signal to switch 312 via connection 338, to switch 314 via connection 340 and to switch 316 via connection 342. As will be described hereinafter, controller 304 determines the appropriate switch position control signal provided to the switches based upon the timing of a time-duplexed communication signal, or another appropriate multiplexed communication signal, as described below. The required input signal for controller 304 is provided over connection 344.

When the MVL transceiver is communicating to a first customer premises (not shown) over a first communication connection, such as, but not limited to subscriber loop (not shown), coupled to line coupler A, the controllable line selection unit 300 provides connectivity between the MVL transceiver and line coupler A. Controller 304 instructs switch 310, residing in transmit line selector 306, to actuate to position A such that connection 318 and 322 are coupled together, thereby providing connectivity for transmission of the Tx+ signal between the MVL transceiver and the first customer premises, via line coupler A and the first communication connection. Concurrently, switch 312 is actuated to position A so that connection 320 is coupled to connection 324, thereby providing connectivity for transmission of the Tx− signal between the MVL transmitter and the first customer premises, via line coupler A and the first communication connection.

Similarly (and concurrently), controller 304 instructs switch 314, residing in receive line selector 308, to actuate to position A such that connection 326 and 330 are coupled together, thereby providing connectivity for transmission of the Rx+ signal between the first customer premises and the MVL transceiver, via line coupler A and the first communication connection. Concurrently, switch 316 is actuated to position A so that connection 328 is coupled to connection 332, thereby providing connectivity for transmission of the Rx− signal between the first customer premises and the MVL transceiver, via line coupler A and the first communication connection. Thus, when all four switches (310, 312, 314 and 316) are actuated to position A, the MVL transceiver (transmitter and receiver) is coupled to the first customer premises.

2. Time Duplexed Communication Signal

Figure 18:
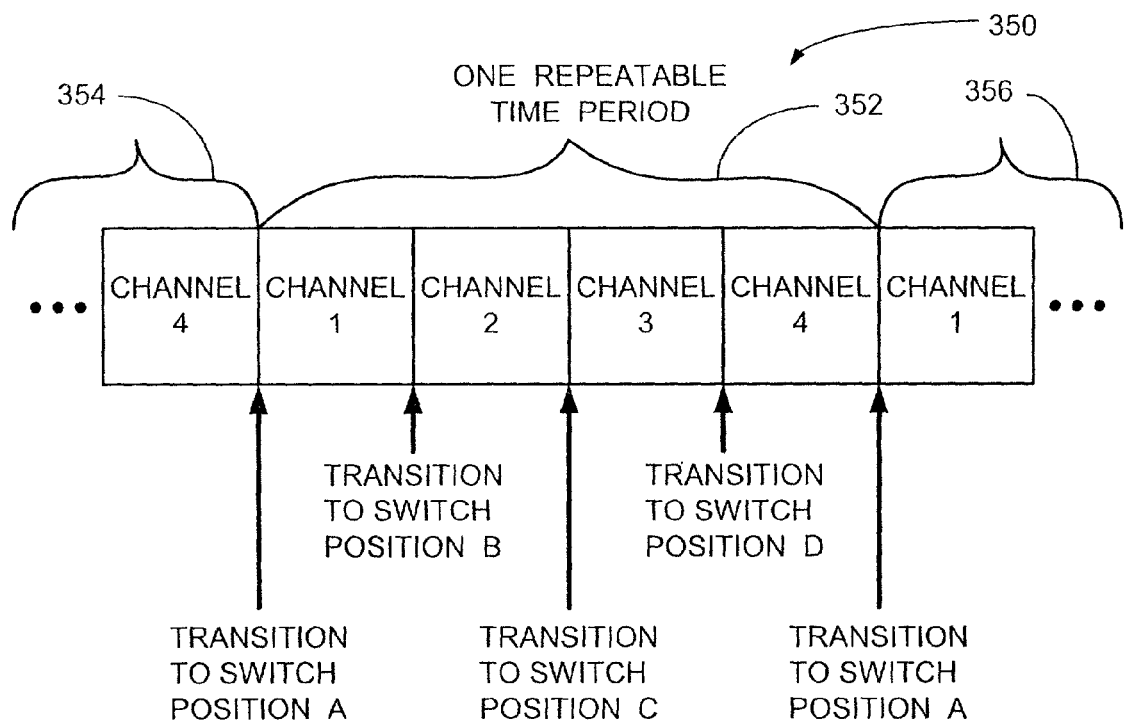
FIG. 18 illustrates an exemplary controllable switch timing sequence applied to a four channel time-duplexed communication signal by the controllable line selection unit.

FIG. 18 illustrates an exemplary four channel time-duplexed communication signal 350. As is well known in the art, a plurality of communication signals may be time-division multiplexed for transmission over a single communication connection by allocating each communication signal to a predefined communication channel. The communication channel is assigned a portion of a repeatable time period. In the illustrative example of the time-duplexed communication signal 350 illustrated in FIG. 18, four individual communication signals are being transmitted over a single communication connection (not shown). The first communication signal is assigned to channel 1. Similarly, the second communication signal is assigned to channel 2, the third communication signal is assigned to channel 3 and the fourth communication signal is assigned to channel 4. For convenience of illustration, channels 1, 2, 3 and 4 are shown to have a time period allocation approximately equal to one-quarter of the repeatable time period 352, and are ordered in the sequence as shown in FIG. 18. Thus, the first communication signal is communicated during the time period allocated to channel 1. Likewise, the second, third and fourth communication signals are communicated during the times allotted to channels 2, 3 and 4, respectively.

During the channel 1 time period, the controller 300 (FIG. 17) actuates switches 310, 312, 314 and 316 to position A (see FIG. 17). When the channel 1 time period ends and the channel 2 time period begins, controller 304 provides a switch position control signal to switches 310, 312, 314 and 316 such that the switches are actuated to position B (see FIG. 17). As described hereinafter, position B provides connectivity between the MVL transceiver and a second line coupler, thereby providing connectivity to a second communication connection connecting to a second customer premises. Thus, a second communication signal is being communicated by the MVL transceiver through the controllable line selection unit 300 (which has actuated switches 310, 312, 314 and 316 to position B), thereby providing connectivity to the second customer premises.

Similarly, during the channel 3 time period, controller 304 actuates switches 310, 312, 314 and 316 to position C. Thus, the third communication signal is being communicated between the MVL transceiver and a third customer premises through the controllable line selection unit 300 (which has actuated switches 310, 312, 314 and 316 to position C to provide connectivity via a third line coupler and a third communication connection).

Likewise, during the channel 4 time period, controller 304 actuates switches 310, 312, 314 and 316 to position D. Thus, the fourth communication signal is being communicated between the MVL transceiver and a fourth customer premises through the controllable line selection unit 300 (which has actuated switches 310, 312, 314 and 316 to position D to provide connectivity via a fourth line coupler and a fourth communication connection).

When the channel 4 time period ends, a new repeatable time period 352 begins with channel 1. Controller 304 then provides a switch position control signal to switches 310, 312, 314 and 316 such that the switches are actuated to position A. The sequence of providing the switch position control signals by controller 304 to switches 310, 312, 314 and 316 is repeated for channels 2, 3 and 4, thereby providing connectivity to four different customer premises at the appropriate times. That is, during the repeating channel 1 time period, the first communication signal is communicated between the MVL transceiver and the first customer premises (via the first subscriber loop) through line coupler A (switches 310, 312, 314 and 316 are actuated to position A as shown in FIG. 17). Then, controller 304 actuates switches 310, 312, 314 and 316 to position B such that the second communication signal is communicated between the MVL transceiver and a second customer premises during the channel 2 time period. Next, controller 304 actuates switches 310, 312, 314 and 316 to position C such that the third communication signal is communicated between the MVL transceiver and a third customer premises during the channel 3 time period. Finally, controller 304 actuates switches 310, 312, 314 and 316 to position D such that the fourth communication signal is communicated between the MVL transceiver and a fourth customer premises during the channel 4 time period.

The operation of controller 304 as described above in association with the time-duplexed communication signal 350 (FIG. 18) requires that an input signal be provided to controller 304 over connection 344 (FIG. 17). The input signal to controller 304 must have means to identify the transition between the allocated time periods for each channel in the time-duplexed communication signal 350. For example, and as illustrated in FIG. 18, when the repeatable time period 354 ends at the conclusion of the channel 4 time period, the input signal provided to controller 304 should indicate the end of the channel 4 time period of repeatable time period 354 (or alternatively, the beginning of the channel 1 time period of repeatable time period 352). Controller 304 can then provide a switch position control signal to switches 310, 312, 314 and 316 such that the switches are actuated to position A. Similarly, at the end of the channel 1 time period of repeatable time period 352 (or alternatively, the beginning of the channel 2 time period of repeatable time period 352), controller 304 should provide a switch position control signal to switches 310, 312, 314 and 316 such that the switches are actuated to position B. Then, at the end of the channel 2 time period of repeatable time period 352 (or alternatively, the beginning of the channel 3 time period of repeatable time period 352), controller 304 should provide a switch position control signal to switches 310, 312, 314 and 316 such that the switches are actuated to position C. Next, at the end of the channel 3 time period of repeatable time period 352 (or alternatively, the beginning of the channel 4 time period of repeatable time period 352), controller 304 should provide a switch position control signal to switches 310, 312, 314 and 316 such that the switches are actuated to position D. The process described above repeats at the end of the channel 4 time period of repeatable time period 352 (or alternatively, the beginning of the channel 1 time period of repeatable time period 356), as controller 304 provides a switch position control signal to switches 310, 312, 314 and 316 such that the switches are actuated to position A.

As described above, controllable line selection unit 300 was illustrated as having switches with four output positions. A controllable line selection unit 300 may employ switches having two, three or more than four output positions. Such a control line selection unit 300 would be employed in a communication system communicating a time-duplexed communication signal having two, three or more than four communication channels, respectively. However, a controllable line selection unit 300 employing switches having more output positions than the available number of communication channels could be implemented in a communication system. For example, a controllable line selection unit 300 may employ switches having five output positions; A, B, C, D and E. In this example, channels one, two, three and four could be assigned to output positions A, B, C and D, respectively, as described above. Position E would not be assigned to a communication channel and remain inactive. That is, in the repeating sequence wherein the switch positions were actuated according to the assigned time channels, output position E would be simply bypassed. This technique may be particularly advantageous in communication systems in which the nature of the time-duplexed communication signal might change in the future, or when it may be desirable to have flexibility in reassigning channels to different output positions. Alternatively, channels one, two, three and four could be assigned to output positions A, B, C and E (thereby bypassing position D). Or, a fifth channel (assigned to output position E) may be added to the communication signal.

3. Controllable Line Selection Unit Coupled to Four POTS Connections

Figure 19:
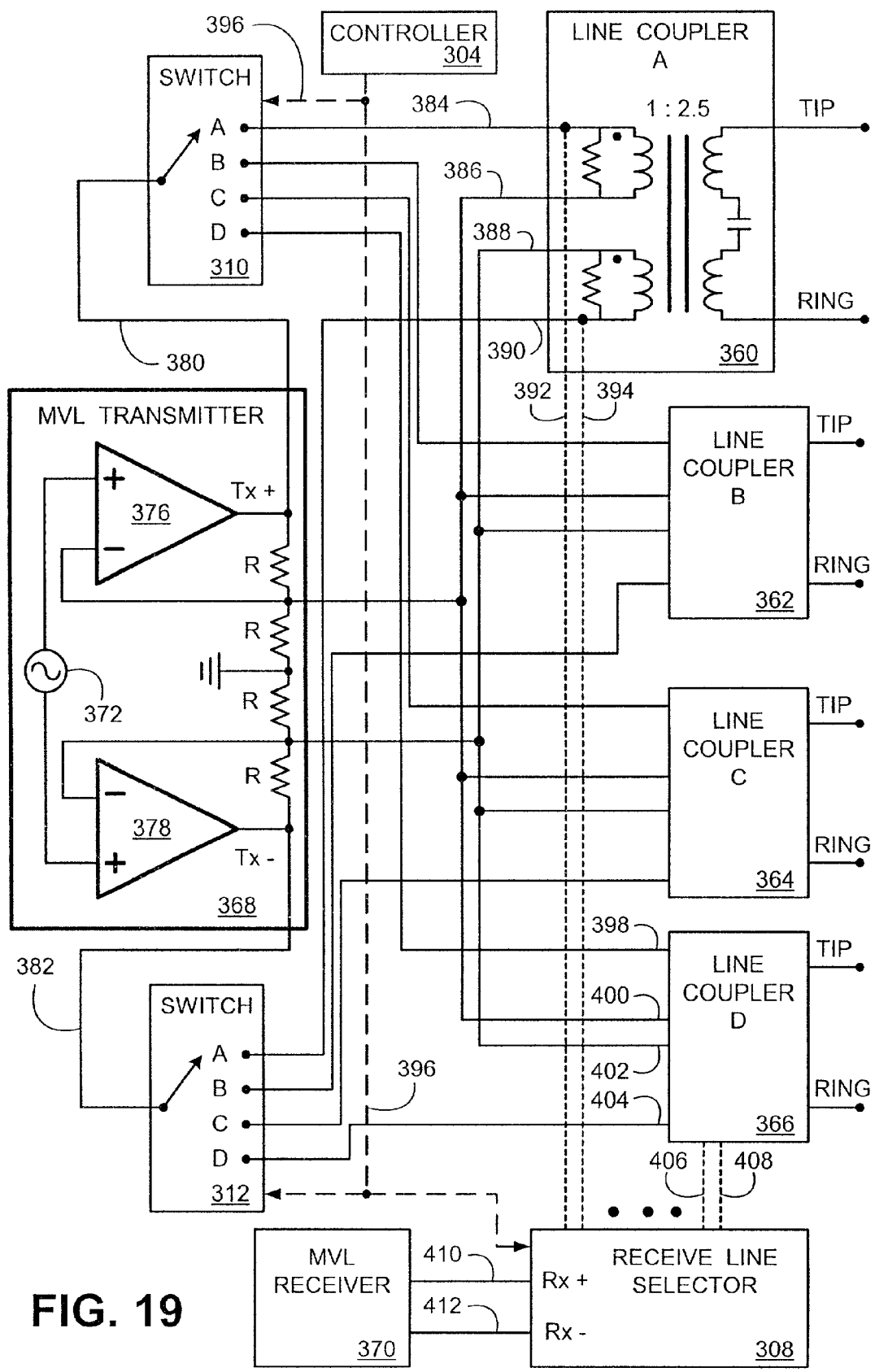
FIG. 19 illustrates selected components of a preferred embodiment of the controllable line selection unit coupled to four line couplers.

FIG. 19 illustrates selected components of a preferred embodiment of the exemplary controllable line selection unit 300 (FIG. 17) having four switch positions coupled to four line couplers (360, 362, 364 and 366). For convenience of illustration, the selected components of the controllable line selection unit 300, are illustrated without regard to actual orientation or placement in an actual operating communication system. Rather, the orientation of the selected components shown in FIG. 19 is based upon the need to conveniently describe the operation and functionality of a controllable line selection unit 300 and to illustrate the connections between an exemplary transmitter 368, an exemplary receiver 370 residing in a MVL transceiver (not shown) and four exemplary line couplers 360, 362, 364 and 366. The first line coupler 360 is hereinafter referred to as line coupler A, for convenience, because line coupler A corresponds to position A of switches 310 and 312 (and switches residing in receive line selector 308, which are not shown in FIG. 19). Similarly, the second line coupler 362 is hereinafter referred to as line coupler B (because line coupler B corresponds to switch position B), the third line coupler 364 is hereinafter referred to as line coupler C (because line coupler C corresponds to switch position C), and the fourth line coupler 366 is hereinafter referred to as line coupler D (because line coupler D corresponds to switch position D).

Line coupler A is coupled to the tip and ring conductors of a first communication connection, such as, but not limited to, a subscriber loop (not shown). Referring back to the general communication system topography illustrated in FIG. 3, subscriber loop 26A corresponds to the "first" communication connection described above. Subscriber loop 26A provides connectivity between the MVL transceiver 60 and customer premises 24A (which corresponds to the "first" customer premises described above). In the communication system illustrated generally in FIG. 3, line coupler A would be coupled at a convenient location on connection 62A.

Line coupler B is similarly connected to the tip conductor and the ring conductor of a second communication connection (not shown). Referring back to the general communication system topography illustrated in FIG. 3, subscriber loop 26B corresponds to the "second" communication connection described above. Subscriber loop 26B provides connectivity between the MVL transceiver 60 and customer premises 24B (which corresponds to the "second" customer premises described above). In the communication system illustrated generally in FIG. 3, line coupler B would be coupled at a convenient location on connection 62B.

Likewise, line coupler C provides coupling to a third communication connection (not shown) and line coupler D provides coupling to a fourth communication connection (not shown). Referring back to the general communication system topography illustrated in FIG. 3, subscriber loop 26C corresponds to the "third" communication connection described above and subscriber loop 26D corresponds to the "fourth" communication connection. Subscriber loop 26C provides connectivity between the MVL transceiver 60 and customer premises 24C (which corresponds to the "third" customer premises described above). Subscriber loop 26D provides connectivity between the MVL transceiver 60 and customer premises 24D (which corresponds to the "fourth" customer premises described above). In the communication system illustrated generally in FIG. 3, line coupler C would be coupled at a convenient location on connection 62C, and line coupler D would be coupled at a convenient location on connection 62D.

Returning now to FIG. 19, the exemplary MVL transmitter 368 is shown as having a signal generator 372 and two amplifiers 376 and 378. Also shown in MVL transmitter 368 are a plurality of resistors R. The components of the MVL transmitter 368 as shown in FIG. 19 are intended to demonstrate one possible embodiment of a transmitter and the associated connections to line couplers A–D. MVL transmitter 368 generates a full duplex communication signal such that the amplifier 376 outputs the Tx+ signal and amplifier 378 outputs the Tx− signal.

The Tx+ signal from MVL transmitter 368 is provided to switch 310 via connection 380. The Tx− signal is provided to switch 312 via connection 382. When the switches are actuated to the A for communication of the Tx+ signal position (corresponding to channel 1 in the example above) connectivity to line coupler A is provided from the A position in switch 310 via connections 384 and 386. Likewise, when switch 312 is actuated to the A position, connectivity to line coupler A for communication of the TX− signal is provided over connections 388 and 390. Switches (not shown) in the receive line selector 308 are also actuated to position A such that any received signals (Rx+ and Rx−) may be detected over connections 392 and 394. As described above, controller 304 has provided switch position control signal to switch 310 and switch 312, and switches residing in receive line selector 308 to actuate to position A via connection 396.

For convenience of illustration, controller 304 is coupled to the switches via the single connection 396. Such a controller employing a signal connection to couple to all switches would provide the same switch position control signal to each switch. However, a controller 304 according to FIG. 17 which employs separate connections to each switch, could have been equally employed here without departing substantially from the operation and functionality of the present invention.

As the communication signal 350 (FIG. 18) is cycling from channel 1 to channel 2 to channel 3 to channel 4, controller 304 provides switch position control signals to the switches to actuate the switches to positions A, B, C and D, respectively. When communications are occurring during the channel 4 time period, switches are actuated to position D as described above. As illustrated in FIG. 19, line coupler D is now coupled to the MVL transmitter 368 via connections 398, 400, 402 and 404 as shown. Similarly, receive line selector 308 would be coupled to line coupler D via connections 406 and 408. Receive line selector 308 is coupled to the MVL receiver 370 such that the Rx+ signal is provided over connection 410 to the MVL receiver 370 and the Rx− signal is provided over connection 412 to MVL receiver 370.

The embodiment illustrated in FIG. 19 is intended to be an example of one of many possible communication systems which could effectively employ a controllable line selection unit. The present invention is equally applicable to communication systems which employ different configurations of transmitters, receivers and/or line couplers. Any such communication system employing a controllable line selection unit is intended to be within the scope of this disclosure and to be protected by the accompanying claims for the controllable line selection unit.

4. Operation of the Preferred Embodiment with a Time Duplexed Communication Signal to Prevent Propagation of Leakage Signals One skilled in the art, upon consideration of the elements and operating processes for a controllable line selection unit 300, as described above in relation to FIGS. 17–19, will realize that when the first communication signal is being communicated during the channel 1 time period, the MVL transceiver would be coupled to the first communication connection (through line coupler A) because the controller 304 has provided the necessary switch position control signal to actuate switches 310, 312, 314 and 316 to position A. During this time, the MVL transmitter 368 and the MVL receiver 370, are isolated from the other communication connections. Thus, the physical isolation from the other communication connections prevents a leakage signal generated by communication signals on the second, third and/or fourth communication connections from propagating onto the first communication connection.

When the second communication signal is being communicated during the channel 2 time period (FIG. 18), the MVL transceiver would be coupled to the second communication connection (through line coupler B) because the controller 304 has provided the necessary switch position control signal to actuate switches 310, 312, 314 and 316 to position B. During this time, the MVL transmitter 368 and the MVL receiver 370, are isolated from the other communication connections. Thus, the physical isolation from the other communication connections prevents a leakage signal generated by communication signals on the first, third and/or fourth communication connections from propagating onto the second communication connection.

Similarly, when the third communication signal is being communicated during the channel 3 time period (FIG. 18), the MVL transceiver would be coupled to the third subscriber loop (through line coupler C) because the controller 304 has provided the necessary switch position control signal to actuate switches 310, 312, 314 and 316 to position C. During this time, the MVL transmitter 368 and the MVL receiver 370, are isolated from the other communication connections. Thus, the physical isolation from the other communication connections prevents a leakage signal generated by communication signals on the first, second and/or fourth communication connections from propagating onto the third communication connection.

Finally, when the fourth communication signal is being communicated during the channel 4 time period (FIG. 18), the MVL transceiver would be coupled to the fourth communication connection (through line coupler D) because the controller 304 has provided the necessary switch position control signal to actuate switches 310, 312, 314 and 316 to position D. During this time, the MVL transmitter 368 and the MVL receiver 370, are isolated from the other communication connections. Thus, the physical isolation from the other communication connections prevents a leakage signal generated by communication signals on the first, second and/or third communication connections from propagating onto the fourth communication connection.

Controllable line selection unit 300, as described in FIGS. 17–19, employ switches having four output positions A–D. As noted above, the controllable line selection unit 300 may employ switches having two, three or more than four output positions. Such an embodiment of a controllable line selection unit 300 may be particularly desirable when the communication system has two, three or more than four communication connections connecting back to customer premises to which the controllable line selection unit 300 is to provide coupling to. For example, in a controllable line selection unit 300 employing switches having five output positions A–E, the controllable line selection unit 300 could be connected to five different line couplers, thereby providing for connectivity to five different customer premises. By appropriately assigning communication channels to the desired switch output positions A–E, connectivity to the five customer premises could be provided as required. For example, in the situation of a communication signal having only four channels, channel 1 could be assigned to output position A, channel 2 assigned to output position B, channel 3 assigned to output position C, and channel 4 assigned to output position D. Alternatively, channel 4 might be assigned to output position E (rather than output position D). Such a configuration may be particularly advantageous when customers are changing service levels with their service providers or in situations where the network topology is being altered. Furthermore, it is not necessary that the channel assignments to be made in the sequential order of the switch output positions. That is, channels 1, 2, 3 and 4 might be assigned to channels A, C, E and B, respectively. Or, the channels may be assigned to any desired output switch position. Furthermore, a single output switch position may be assigned multiple channels. For example, channels one and three might be assigned to switch output position C. Any such alternative embodiments of a controllable line selection unit 300 as described above, are intended to be within the scope of this disclosure and to be protected by the accompanying claims for a controllable line selection unit.

5. Controller System Components

Figure 20:
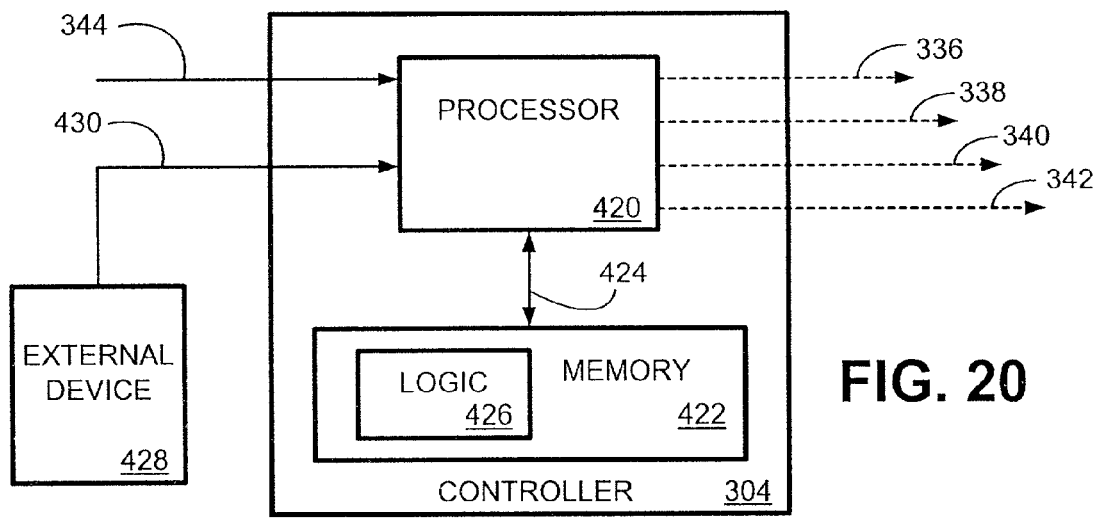
FIG. 20 illustrates selected components which may be employed in a controller implemented as part of a controllable line selection unit shown in FIG. 17.

FIG. 20 illustrates selected components which may be employed in a controller 304 implemented as part of a controllable line selection unit 300 (FIG. 17). Controller 304 has at least a processor 420 in communication with a memory 422 via connection 424. Logic 426 resides in memory 422. Processor 420 is shown to have at least four control signal output connections 336, 338, 340 and 342 (see also FIG. 17). As noted above, the required input signal for controller 304 is provided over connection 344, shown coupled to processor 420 in FIG. 20. Processor 420 is detecting the channel transitions previously described for FIG. 18. Processor 420 is also coupled to an external device 428 via connection 430.

External device 428 provides information regarding the channel assignments to switch output positions to processor 420. Processor 420 stores the switch position and channel assignment information in memory 422. External device 428 may be any type of suitable device which provides the necessary information to processor 420. For example, external device 428 may be a keyboard used by an operator to manually provide the switch position and channel assignment information to processor 420. Alternatively, external device 428 may be another processing system which provides the necessary information to processor 420. One skilled in the art will appreciate that the external device 428 may be implemented using well-known techniques commonly employed in the art. Memory 422 may be a composite memory having a variety of different types of memory elements, such as, read only memory (ROM) and/or random access memory (RAM) or other suitable memory elements. Thus, a detailed explanation of the elements, components, functionality and/or operation of the external device 428 and memory 422 is not provided herein as such a detailed explanation is not necessary to the understanding of the operation and functionality of a controllable line selection unit 300. It is intended that all such variations in the type of external device 428 and memory 422 employed be within the scope of this disclosure and to be protected by the accompanying claims for a controllable line selection unit.

For convenience of illustration in FIG. 20, processor 420, logic 426 and memory 422 are shown residing in controller 304. These components may reside in alternative convenient locations outside of the controller 304, as components of other systems, or as stand alone dedicated elements without adversely affecting the operation and functionality of the controllable line selection unit. Furthermore, processor 420 is shown for convenience of illustration as directly providing the switch position control signals to the switches via connections 336, 338, 340 and 342. In alternative embodiments, intermediate devices (not shown) may be employed such that the switch position control signal generated by processor 420 is configured to a suitable signal for the actuation of the switches residing in a controllable line selection unit 300 (FIG. 17). Any such alternative embodiments of a controllable line selection unit 300 are intended to be within the scope of this disclosure and to be protected by the accompanying claims for a controllable line selection unit.

6. Controllable Line Selection Unit Operation Flow Chart

Figure 21:
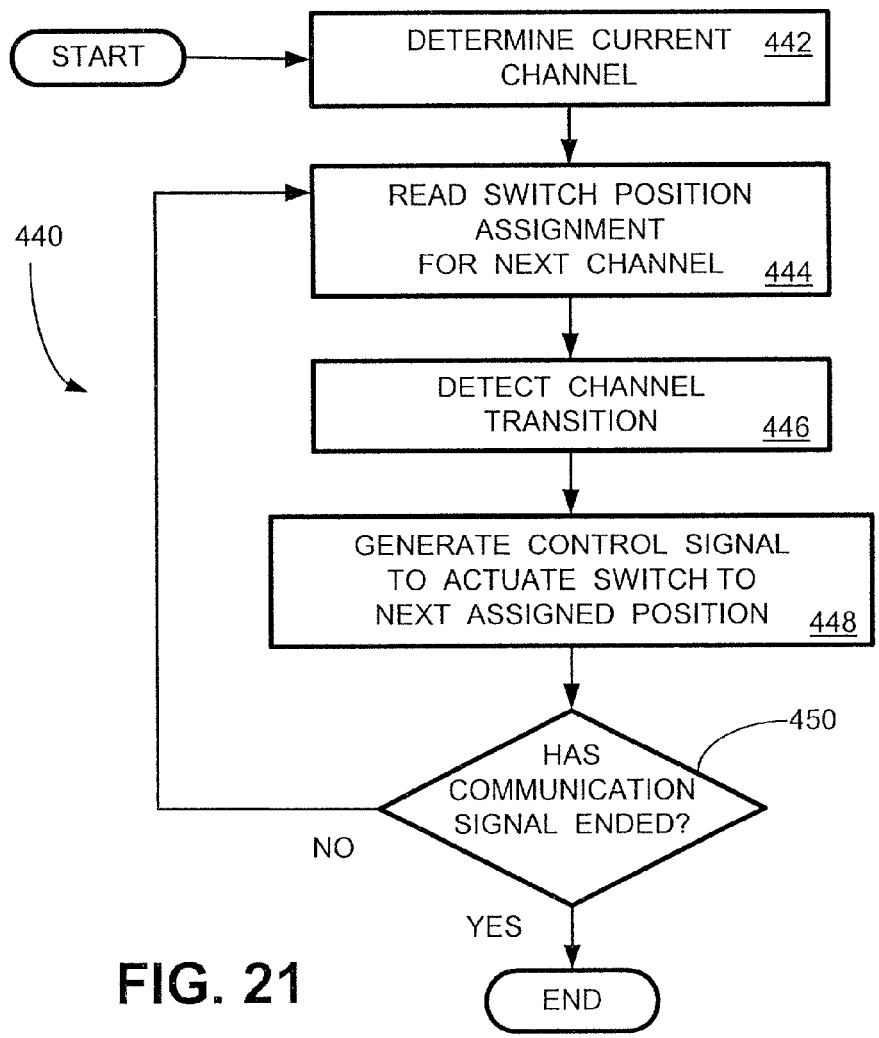
FIG. 21 is a flow chart illustrating the operation of the logic of FIG. 20 as applied to a method for controlling switch out positions in a controllable line selection unit of FIG. 17.

FIG. 21 is a flow chart 440 illustrating the operation of the logic 426 of FIG. 21 as applied to a method for controlling switch output positions in a controllable line selection unit 300 (FIG. 17). The flow chart of FIG. 21 shows the architecture, functionality, and operation of a possible implementation of the software for implementing the logic 426. In this regard, each block may represent a module, segment or portion of code, which comprises one or more executable instructions for implementing the specified logical function(s). It should also be noted that in some implementations, the functions noted in the blocks may occur out of the order noted in FIG. 21 or may include additional functions without departing significantly from the functionality of the controllable line selection unit 300. For example, two blocks shown in succession in FIG. 21 may in fact be executed substantially concurrently, the blocks may sometimes be executed in reverse order, or some of the blocks may not be executed in all instances, depending upon the functionality involved, as will be further clarified below. All such modifications and variations are intended to be included within the scope of this disclosure and to be protected by the accompanying claims for a controllable line selection unit. In block 442, logic 426 determines the current channel of the communication signal. For example, communications assigned to channel 1 (see FIG. 18) may be currently in progress. Once the current channel is determined, the associated switch position assignment is read from memory 422 (FIG. 20). In this illustrative example, the next channel would be channel 2 and the switch position assignment for channel 2 is switch position B.

The communication signal is monitored to detect the channel transition at block 446. In this illustrative example, the logic 426 would be detecting the transition from channel 1 to channel 2 (see also FIG. 18). Then, controller 304 (FIG. 17) would generate a switch position control signal to actuate the switches to the next assigned position, here, position B (see also FIG. 18). Then, logic 426 would determine whether or not the communication signal is on-going (the YES condition) or if the communication signal has ended (the NO condition). If the communication signal has not ended (the YES condition) the process returns to block 444 and continues accordingly. If the communication signal has ended (the NO condition) the process ends.

7. Alternative Embodiments of a Controllable Line Selection Unit

As noted above, alternative embodiments of the controllable line selection unit may be employed as a means for isolating communication connections such that leakage signals generated from communication signals do not propagate onto other communication connections. The operation and functionality of the controllable line selection unit was described above with respect to a communication signal having four portions assigned to four different channels. For convenience of illustration, and for convenience of explaining the functionality and operation of a controllable line selection unit, four channels were selected with each channel having approximately an equal time period. As noted above, a controllable line selection unit will perform equally well on a communication signal having two channels, three channels or more than four channels. Furthermore, the numbers of channels may periodically change and/or the time periods of each channel may not be approximately equal. Alternative embodiments of a controllable line selection unit may be easily configured to detect any plurality of channels, and since the controllable line selection unit detects transitions from one channel to the next channel, the time periods associated with each channel need not be equal. Furthermore, the controllable line selection unit may be configured to assign the same switch position to one or more of the plurality of channels. A detailed explanation of the components, operation and functionality of such alternative embodiments is not described herein as one skilled in the art can readily appreciate operation and functionality of such alternative embodiments, and therefore easily practice any such alternative embodiments of a controllable line selection unit. Furthermore, such alternative embodiments are too numerous to individually describe in a single application specification. Any such alternative embodiments of a controllable line selection unit are intended to be within the scope of this disclosure and to be protected by the accompanying claims for the controllable line selection unit.

For convenience of illustration and for convenience of explaining the operation and functionality of the controllable line selection unit, an exemplary four channel time-division multiplexed communication signal was described. The controllable line selection unit will perform equally well with other types of communication signals, such as, but not limited to, a time division multiplexed echo canceled communication signal, a time-division multiplexed frequency-division communication signal, a time-division time-compressed communication signal or other suitable communication signal having at least two time-multiplexed channels. The controllable line selection unit detects transitions in a communication signal and activates switches to predefined positions based upon the detected transitions. The detected transitions correspond to portions of a communication signal that are intended to be communicated to one of a plurality of different locations and/or different devices. Any such alternative embodiments of a controllable line selection unit configured to detect transitions in a communication signal and is configured actuate switch positions accordingly, are intended to be within the scope of this disclosure and to be protected by the accompanying claims for the controllable line selection unit.

In some applications, it may be desirable to detect periods of communication inactivity (no transmit signal or receive signal) in a channel. One alternative embodiment of a controllable line selection unit detects such periods of inactivity in a channel and selectively reassigns the time allocated to the unused channel to another channel which is actively communicating. For example, referring to FIG. 18, during certain times channel 3 may be inactive (no communications present during the time allocated to channel 3). Logic residing in the controller may selectively reallocate the time allocated to channel 3 to another active channel. For example, communications during the time allocated to channel 4 may be very active. Logic may then expand the time period allocated to channel 4 (by reducing the time period allocated to channel 3), thereby increasing the amount of data flow occurring over channel 4. Another embodiment operates such that the switch position assigned to channel 4 is concurrently assigned to channel 3.

Figure 22:
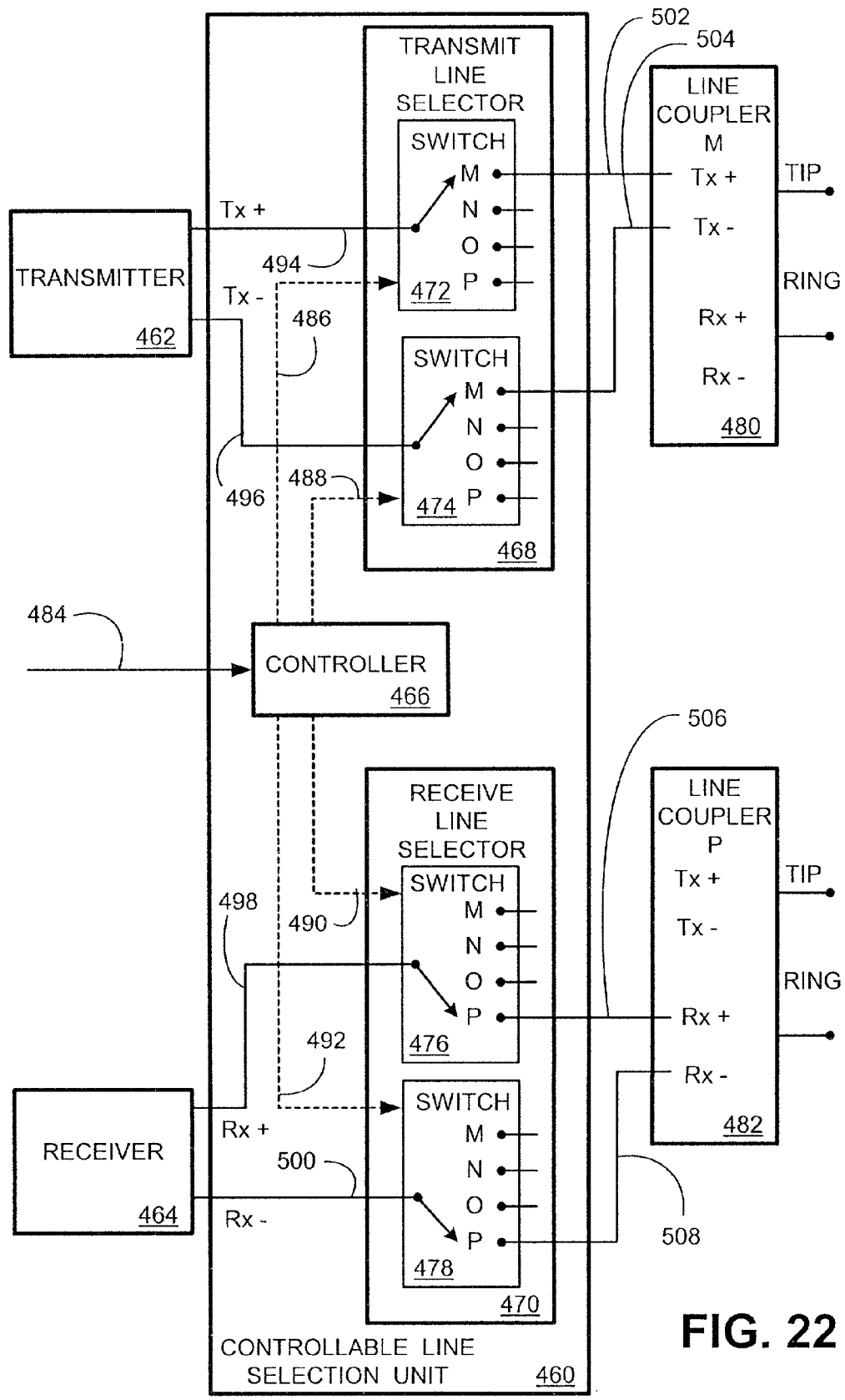
FIG. 22 illustrates an alternative embodiment of a controllable line selection unit.

FIG. 22 illustrates an alternative embodiment of a controllable line selection unit 460. Controllable line selection unit 460 is coupled to a separate transmitter 462 and a separate receiver 464. Similar to the controllable line selection unit 300 (FIG. 17), the controllable line selection unit 460 has a controller 466, a transmit line selector 468 and a receive line selector 470. The transmit line selector 468 has a first switch 472 and a second switch 474. Similarly, receive line selector 470 has a first switch 476 and a second switch 478.

Switches 472, 474, 476 and 478 have four output switch positions M, N, 0 and P. Similar to the controllable line selection unit 300 (FIG. 17), the switches 472, 474, 476 and 478 residing in controllable line selection unit 460 may be coupled to up to four line couplers. For convenience of explaining the operation and functionality of the controllable line selection unit 460, a first coupler 480 and a second coupler 482 are shown. Line coupler 480 is hereinafter referred to as line coupler M (because line coupler M corresponds to switch position M) and line coupler 482 is hereinafter referred to as line coupler P (because line coupler P corresponds to switch position P).

Controller 466 detects the above-described transitions between channels in a communication signal, via connection 484, and provides the appropriate switch position control signals to switch 472, via connection 486, to switch 474 via connection 488, to switch 476 via connection 490 and to switch 478 via connection 492.

The controllable line selection unit 460, configured according to FIG. 22, provides for the simultaneous transmission of a first communication signal (Tx+ and Tx−) to a selected one of the plurality of line couplers, and the receiving of a second communication signal (Rx+ and Rx−) by receiver 464. As illustrated in FIG. 22, transmitter 462 is coupled to line coupler M. Receiver 464 is coupled to a different one of the plurality of line couplers, having line coupler P.

Connection 494 couples switch 472 with the transmitter 462 so that the Tx+ signal may be transmitted over a first communication connection coupled to line coupler M. Similarly, connection 496 couples switch 474 to transmitter 462 for transmission of the Tx− signal. Connection 498 couples switch 476 to the receiver 464 so that the Rx+communication signal can be received over a second communication connection coupled to line coupler P. Likewise, connection 500 couples switch 478 to the receiver 464 so that the Rx− communication signal can be received.

The operation and functionality of the controllable line selection unit 460 is described by way of a simplified illustrative example, and is illustrated accordingly in FIG. 22. Controllable line selection unit 460 provides for the simultaneous communication of two communication signals as follows. A first communication signal being communicated during a first channel (time period) is transmitted to line coupler M via connections 502 and 504. That is, controller 466 has actuated switches 472 and 474 to the M position during this first channel. Simultaneously, controller 466 has actuated switches 476 and 478 to the P position such that line coupler P is coupled to receiver 464. Receiver 464 is receiving a second communication signal from line coupler P, via connections 506 and 508, during this first channel.

When transmitter 462 is to transmit to a different location, a channel transition is detected by controller 466 and switches 472 and 474 are actuated to a different switch position. Likewise, controller 466 will actuate switches 476 and 478 to a different position when a channel transition in the second communication signal is detected. Generally, the switch positions in switch 472 and switch 474 (which are transmitting a first communication signal to a pre-selected line coupler) would not be the same as the switch positions in switch 476 and switch 478 (which are configured to couple receiver 464 to a second one of the plurality of line couplers).

The operation and functionality of the controllable line selection unit may be implemented using any commonly available type of communication connection switcher. The line switching functions performed by such switch(es), controlled by a processor or other actuating device, may be implemented with any type of electronic, solid state or firmware type switching device or means commonly employed in the art. Such processor based switch(es) in an (alternative) embodiment of the controllable line selection unit would be implemented by a combination of software and firmware using components and methods commonly employed in the art of switching electrical devices. It is intended that all such implementations of switch(es), and their associated control means, be included herein within the scope of this disclosure and be protected by the accompanying claims for the controllable line selection unit.

Figure 23:
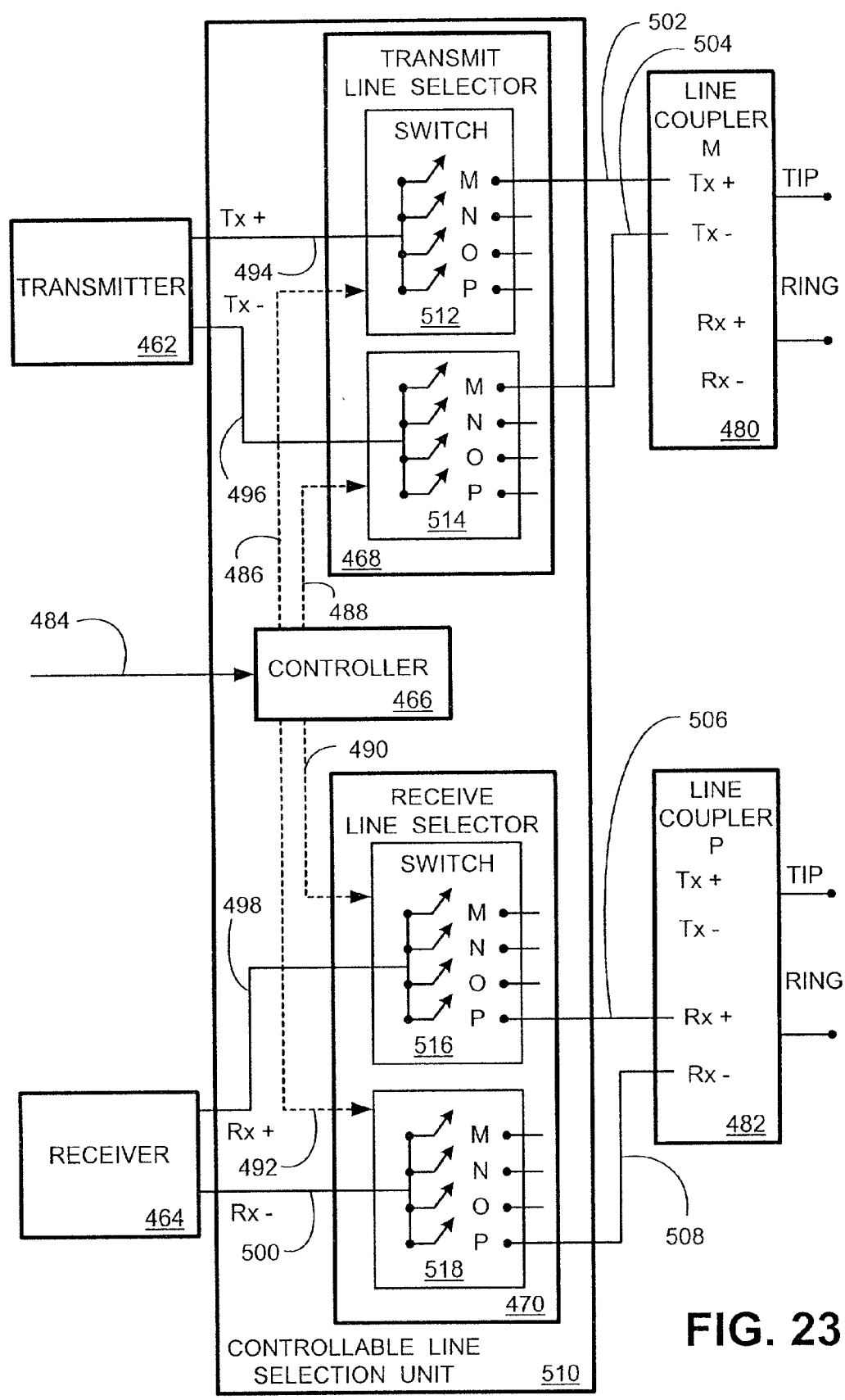
FIG. 23 illustrates another alternative embodiment of a controllable line selection unit. For convenience of illustration, elements among the several figures that are similar to each other may bear the same reference numerals. Such elements bearing the same reference numerals may be considered to be like elements, however, since these like numeraled elements are incidental to the operation of the present invention which utilizes existing portions of a communication network, one skilled in the art will realize that like numeraled elements among the several figures need not be identical, as any variations of such elements will not adversely affect the functioning and performance of the present invention. Furthermore, like elements that are like-numbered may be described in detail only in the first instance of occurrence, and not described in detail again when occurring in subsequent figures.

One such alternative embodiment of a controllable line selection unit 510 is illustrated in FIG. 23. The controllable line selection unit 510 is coupled to a controller 466, transmitter 462 and receiver 464 in a similar manner as shown with the controllable line selection unit 460 shown in FIG. 22. However, when the controller actuates switches 512 and 514, broadcast transmission switches, all line couplers connected to switch positions M, N, O and P are simultaneously coupled to the transmitter 462, thereby providing broadcast message capability. Thus, a single message will be transmitted to all connected line couplers. Such an embodiment could be overlaid on top of any other previously described embodiment of a controllable line selection unit. That is, the M, N, O and P switch positions of switch 512 would be coupled to the M, N, O and P switch positions of switch 472 (FIG. 22), respectively. Or, the controllable line selection unit 510 could be implemented as a stand alone system, which would be particularly suitable for a communication system not having POTS signals or having dedicated communication connections, such as, but not limited to, private data subscriber loops.

Switches 516 and 518 could be similarly configured to switches 512 and 514. Switches 516 and 518, broadcast receiver switches, would simultaneously couple the line couplers to receiver 464 upon activation of switches 516 and 518 by controller 466, thereby providing for the reception of broadcast transmissions.

8. Additional Benefits Realized from a Controllable Line Selection Unit

Controllable line selection unit 460, as described above and illustrated in FIG. 22, provides for the simultaneous transmission of a first communication signal and the receiving of a second communication signal. When operating in this manner, two communication signals may be simultaneously communicated, thereby increasing the overall efficiency of the communication system in which the controllable line selection unit 460 has been implemented. Furthermore, the receiver 464 will be able to receive a communication signal that is free from possible interference created by the components residing in a transmitter 462 because the transmitter 462 is completely isolated from the components residing in receiver 464. Likewise, transmitter 462 may be configured to transmit a communication signal without considering the requirements of the receiver 464, which generally detects a much weaker received communication signal.

F. Alternative Embodiments Implemented on Other Communication Systems

Furthermore, the preferred embodiments of a connection sharing multipoint POTS splitter with the LS blocking splitter, amplifier-based coupler, mask signal generator and controllable line selection unit are illustrated and described in the context of a DSL communications network. However, the concepts and principles of the LS blocking splitter, amplifier-based coupler, mask signal generator and controllable line selection unit are equally applicable to other communication formats, such as, but not limited to ADSL, RADSL, MVL, VDSL or a combination of systems having segments employing different formats for each segment.

It should be emphasized that the above-described "embodiments" of the LS blocking splitter, amplifier-based coupler, mask signal generator and controllable line selection unit, particularly, any "preferred" embodiments, are merely possible examples of implementations, merely set forth for a clear understanding of the principles of the LS blocking splitter, amplifier-based coupler, mask signal generator and controllable line selection unit. Many variations and modifications may be made to the above-described embodiment(s) of the LS blocking splitter, amplifier-based coupler, mask signal generator and controllable line selection unit without departing substantially from the spirit and principles of the LS blocking splitter, amplifier-based coupler, mask signal generator and controllable line selection unit. For example, the principles of the LS blocking splitter, amplifier-based coupler, mask signal generator detailed and controllable line selection unit herein are similarly applicable to other communication services such as, for example but not limited to, ADSL. All such modifications and variations are intended to be included herein within the scope of the LS blocking splitter, amplifier-based coupler, mask signal generator and controllable line selection unit, and be protected by the claims that follow.

The invention claimed is:

1. A system for attenuating leakage signals in a communication system, comprising:
   a multiple virtual line (MVL) transmitter configured to provide signals to a plurality of subscriber loops, each subscriber loop having a tip connection and a ring connection, the MVL transmitter having a first transmit output (Tx+) and a second transmit output (Tx−):
   an amplifier-based coupler coupled between the MVL transmitter and the plurality of subscriber loops, the amplifier-based coupler comprising:
      a first amplifier having an output at least coupled to each tip connection of in the plurality of subscriber loops and at least one input coupled to the Tx+ output of the MVL transmitter, and configured to have a nearly-zero impedance characteristic; and
      a second amplifier having an output at least coupled to each ring connection in the plurality of subscriber loops and at least one input coupled to the Tx− output of the MVL transmitter, and configured to have a nearly-zero impedance characteristic,
      such that at least one leakage signal originating on a first subscriber loop in said plurality of subscriber loops cannot propagate from subscriber loop to a second subscriber loop in said plurality of subscriber loops.

2. The system of claim 1, wherein at least one of said plurality of amplifiers is configured as a negative feedback amplifier.

3. The system of claim 1, further comprising a second plurality of amplifiers, said second plurality of amplifiers coupled between a second plurality of subscriber loops and said MVL transmitter.

4. The system of claim 1, wherein at least one of said plurality of subscriber loops is a digital subscriber loop.

5. The system of claim 1, wherein said first subscriber loop is physically coupled to said second subscriber loop.

6. The system of claim 1, wherein said plurality of subscriber loops are physically coupled together.

7. The system of claim 1, wherein said plurality of subscriber loops are physically coupled to said MVL transmitter.

8. The system of claim 1, wherein said MVL transmitter time multiplexes the signals onto a single channel.

9. The system of claim 1, wherein said MVL transmitter frequency multiplexes the signals onto a plurality of channels.

10. The system of claim 1, wherein said MVL transmitter is a signal multiplexing communication device.

11. The system of claim 1, wherein said MVL transmitter is further configured to concurrently provide signals to said plurality of subscriber loops.

12. A method for shunting leakage signals in a communication system, the method comprising the steps of:
   receiving a differential digital signal, said differential digital signal composed of a plurality of subscriber signals, each subscriber signal associated with a different subscriber;
   coupling a first amplifier between the positive differential digital signal and each tip connection in a plurality of subscriber loops, said first amplifier having a nearly-zero impedance characteristic;
   coupling a second amplifier between the negative differential digital signal and each ring connection in the plurality of subscriber loops, said second amplifier having a nearly-zero impedance characteristic; and
   shunting at least one leakage signal originating on a first subscriber loop in the plurality of subscriber loops away from a second subscriber loop in the plurality of subscriber loops.

13. The method of claim 12, wherein said differential digital signal time multiplexes said plurality of subscriber signals onto a single channel.

14. The method of claim 12, wherein said differential digital signal frequency multiplexes said plurality of subscriber signals onto a plurality of channels.

15. The method of claim 12, wherein said differential digital signal concurrently provides voice service to each of the subscribers.

16. The method of claim 12, wherein said differential digital signal concurrently provides voice service to each of the subscribers.

17. A system for shunting leakage signals in a communication system, comprising:
   means for receiving a differential digital signal from a digital device, said differential digital signal composed of a plurality of subscriber signals, each subscriber signal associated with a different subscriber, said differential digital signal concurrently providing voice service to each of the subscribers;
   means for coupling a first amplifier between the positive differential digital signal and each tip connection in a plurality of subscriber loops, said first amplifier having a nearly-zero impedance characteristic;
   means for coupling a second amplifier between the negative differential digital signal and each ring connection in the plurality of subscriber loops, said second amplifier having a nearly-zero impedance characteristic; and
   means for shunting such that at least one leakage signal originating on a first subscriber loop in the plurality of subscriber loops away from a second subscriber loop in the plurality of subscriber loops coupled to said digital device.

18. The system of claim 17, wherein said means for coupling the first amplifier further couples said second subscriber loop to said shunting means.

19. The system of claim 17, wherein said differential digital signal time multiplexes said plurality of subscriber signals onto a single channel.

20. The system of claim 17, wherein said differential digital signal frequency multiplexes said plurality of subscriber signals onto a plurality of channels.

* * * * *